US012185170B2

(12) United States Patent
Vangala et al.

(10) Patent No.: US 12,185,170 B2
(45) Date of Patent: Dec. 31, 2024

(54) INTEGRATED ACCESS AND BACKHAUL RADIO LINK HANDOVER

(71) Applicant: Apple Inc., Cupertino, CA (US)

(72) Inventors: Sarma V. Vangala, Campbell, CA (US); Fangli Xu, Beijing (CN); Haijing Hu, Los Gatos, CA (US); Murali Narasimha, Cupertino, CA (US); Naveen Kumar R. Palle Venkata, San Diego, CA (US); Ralf Rossbach, Munich (DE); Sethuraman Gurumoorthy, San Ramon, CA (US); Sree Ram Kodali, San Jose, CA (US); Srinivasan Nimmala, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 17/442,084

(22) PCT Filed: Apr. 1, 2021

(86) PCT No.: PCT/CN2021/084951
§ 371 (c)(1),
(2) Date: Sep. 22, 2021

(87) PCT Pub. No.: WO2022/205315
PCT Pub. Date: Oct. 6, 2022

(65) Prior Publication Data
US 2023/0232287 A1 Jul. 20, 2023

(51) Int. Cl.
*H04W 36/00* (2009.01)
*H04W 36/02* (2009.01)

(52) U.S. Cl.
CPC ... *H04W 36/0061* (2013.01); *H04W 36/0079* (2018.08); *H04W 36/0235* (2023.05)

(58) Field of Classification Search
CPC ............. H04W 24/04; H04W 36/0061; H04W 36/0079; H04W 36/023; H04W 84/047
See application file for complete search history.

(56) References Cited

U.S. PATENT DOCUMENTS 8,228,917 B2 * 7/2012 Vayanos ................... H04L 9/12
455/415
9,055,464 B2 * 6/2015 Jonsson ................... H04L 47/27
(Continued)

FOREIGN PATENT DOCUMENTS

CN 111901817 11/2020
CN 115004767 A * 9/2022 ............. H04L 45/74
(Continued)

OTHER PUBLICATIONS

3GPP Technical Specification 38.340, Backhaul Adaptation Protocol (BAP) Specification, Mar. 2021, Release 16, Version 16.4.0 (Year: 2021).*
(Continued)

*Primary Examiner* — Eric Nowlin
(74) *Attorney, Agent, or Firm* — Kilpatrick Townsend & Stockton LLP

(57) ABSTRACT

The present application relates to devices and components including apparatus, systems, and methods for integrated access and backhaul radio link failure and handover scenarios in wireless communication systems.

20 Claims, 19 Drawing Sheets

(56) References Cited

U.S. PATENT DOCUMENTS

| | | | |
|---|---|---|---|
| 11,457,372 B2* | 9/2022 | Byun | H04W 40/12 |
| 11,647,426 B2* | 5/2023 | Zou | H04W 36/0005 370/331 |
| 11,917,698 B2* | 2/2024 | Akl | H04W 88/04 |
| 2020/0029254 A1* | 1/2020 | Xiong | H04L 67/5681 |
| 2021/0058826 A1 | 2/2021 | Mao et al. | |
| 2021/0058882 A1* | 2/2021 | Abedini | H04W 72/56 |
| 2021/0058989 A1* | 2/2021 | Simsek | H04L 47/283 |
| 2021/0250817 A1* | 8/2021 | Zou | H04W 36/0016 |
| 2021/0367888 A1* | 11/2021 | Ramamurthi | H04W 28/0289 |
| 2022/0039188 A1* | 2/2022 | Ishii | H04W 76/19 |
| 2022/0217598 A1* | 7/2022 | Ishii | H04W 36/0058 |
| 2022/0225060 A1* | 7/2022 | Akl | H04W 76/30 |
| 2022/0240103 A1* | 7/2022 | Gummadi | H04W 80/02 |
| 2022/0264413 A1* | 8/2022 | Fujishiro | H04W 76/19 |
| 2022/0361072 A1* | 11/2022 | Zhu | H04W 40/36 |
| 2022/0394797 A1* | 12/2022 | Pradas | H04W 76/19 |
| 2023/0016871 A1* | 1/2023 | Fujishiro | H04B 7/15542 |
| 2023/0111021 A1* | 4/2023 | Zhuo | H04W 36/0058 370/331 |
| 2023/0139323 A1* | 5/2023 | Ishii | H04W 48/20 455/422.1 |
| 2023/0156565 A1* | 5/2023 | Huang | H04W 40/36 |
| 2023/0199879 A1* | 6/2023 | Zhu | H04W 36/0033 370/329 |
| 2023/0232294 A1* | 7/2023 | Teyeb | H04W 36/0235 370/331 |
| 2023/0328625 A1* | 10/2023 | Xu | H04W 36/0005 370/328 |
| 2023/0362779 A1* | 11/2023 | Zhu | H04W 40/246 |
| 2023/0370898 A1* | 11/2023 | Zhu | H04W 28/16 |

FOREIGN PATENT DOCUMENTS

| | | | | |
|---|---|---|---|---|
| EP | 3585025 A1 * | 12/2019 | | H04L 67/2847 |
| EP | 3813440 A1 * | 4/2021 | | H04W 36/0005 |
| EP | 3585025 B1 * | 8/2021 | | H04L 67/2847 |
| EP | 4090070 A1 * | 11/2022 | | H04L 45/74 |
| EP | 4266755 A1 * | 10/2023 | | H04W 40/02 |
| JP | 2021529472 A * | 10/2021 | | |
| JP | 2023511590 A * | 3/2023 | | |
| JP | 2023545794 A * | 10/2023 | | |
| KR | 20210022707 A * | 3/2021 | | |
| KR | 20220131309 A * | 9/2022 | | |
| KR | 20230027174 A * | 2/2023 | | |
| WO | WO-2020059633 A1 * | 3/2020 | | H04W 24/04 |
| WO | 2021031651 | 2/2021 | | |
| WO | WO-2021031651 A1 * | 2/2021 | | H04L 1/0015 |
| WO | WO-2021147107 A1 * | 7/2021 | | H04L 45/74 |
| WO | WO-2021192917 A1 * | 9/2021 | | H04B 7/15542 |
| WO | WO-2022153249 A1 * | 7/2022 | | |
| WO | WO-2023069810 A1 * | 4/2023 | | H04W 40/22 |

OTHER PUBLICATIONS

Huawei et al., Corrections on BAP address and default BAP configuration, Jan. 25, 2021, 3GPP TSG-RAN WG2 Meeting #113-e, Tdoc: R2-2102477 (Year: 2021).*

Qualcomm Incorporated, Fairness support in IAB topology, Apr. 12, 2021, 3GPP TSG-RAN WG2 Meeting #113-bis-e, Agenda Item: 8.4.2, Tdoc: R2-2103081 (Year: 2021).*

Vivo, Discussion on miscellaneous issues in eIAB, Apr. 12, 2021, 3GPP TSG-RAN WG2 Meeting #113-bis-e, Agenda Item: 8.4.2, Tdoc: R2-2103349 (Year: 2021).*

Ericsson, Handling of Unknown and Reserved Values in the BAP Header, Apr. 12, 2021, 3GPP TSG-RAN WG2 #113bis-e, Agenda Item: 6.1.3.5, Tdoc: R2-2103935 (Year: 2021).*

Chen, Method and device for data transmission in relay network, WO 2021031651 A1, English Translation By Google, Google Patents (Year: 2021).*

Discussion on DL E2E Flow and Congestion Control in R17-IAB, ZTE, 3GPP TSG-RAN WG3 #111-e, R3-210718, Feb. 4, 2021, 5 pages.

General RLC Impacts, Huawei, 3GPP TSG-RAN WG2 Meeting #107bis. R2-1912371, Oct. 18, 2019, 11 pages.

International Patent Application No. PCT/CN2021/084951, International Search Report and the Written Opinion, Mailed on Jan. 7, 2022, 9 pages.

New WID on Enhancements to Integrated Access and Backhaul for NR, Qualcomm, 3GPP TSG RAN Meeting #88e, RP-201293, Jun. 29-Jul. 3, 2020, 5 pages.

* cited by examiner

Duplexing enhancements [RAN1-led, RAN2, RAN3, RAN4]:
- Specification of enhancements to the resource multiplexing between child and parent links of an IAB node, including
  - Support of simultaneous operation (transmission and/or reception) of IAB-node's child and parent links (i.e., MT Tx/DU Tx, MT Tx/DU Rx, MT Rx/DU Tx, MT Rx/DU Rx).
  - Support for dual-connectivity scenarios defined by RAN2/RAN3 in the context of topology redundancy for improved robustness and load balancing.
- Specification of IAB-node timing mode(s), extensions for DL/UL power control, and CLI and interference measurements of BH links, as needed, to support simultaneous operation (transmission and/or reception) by IAB-node's child and parent links.

Topology adaptation enhancements [RAN3-led, RAN2]:
- Specification of procedures for inter-donor IAB-node migration to enhance robustness and load-balancing, including enhancements to reduce signalling load.
- Specification of enhancements to reduce service interruption due to IAB-node migration and BH RLF recovery.
- Specification of enhancements to topological redundancy, including support of CP/UP separation.

Topology, routing and transport enhancements [RAN2-led, RAN3]:
- Specifications of enhancements to improve topology-wide fairness, multi-hop latency and congestion mitigation RF and RRM requirements [RAN4-led]:
- Definition of IAB node RF requirements if needed for any Rel-17 extensions.
- Definition of RRM core requirements if needed for any Rel-17 extensions.

INTEGRATED ACCESS AND BACKHAUL RADIO LINK HANDOVER

CROSS-REFERENCE TO RELATED APPLICATIONS

This application is a 371 United States National Phase of PCT International Patent Application No. PCT/CN2021/084951, filed on Apr. 1, 2021; the disclosure of which is incorporated by reference herein in its entirety for all purposes.

BACKGROUND

As fifth generation networks have developed, large numbers of nodeBs for serving user equipment have been implemented. As the number and, in some instances, the remoteness of the nodeBs have increased, connections between the nodeBs and the fifth generation core have been implemented as wireless relay in some instances.

BRIEF DESCRIPTION OF TILE DRAWINGS

FIG. 5 illustrates some example topology adaptation enhancements in accordance with some embodiments.

DETAILED DESCRIPTION

Figure 1:
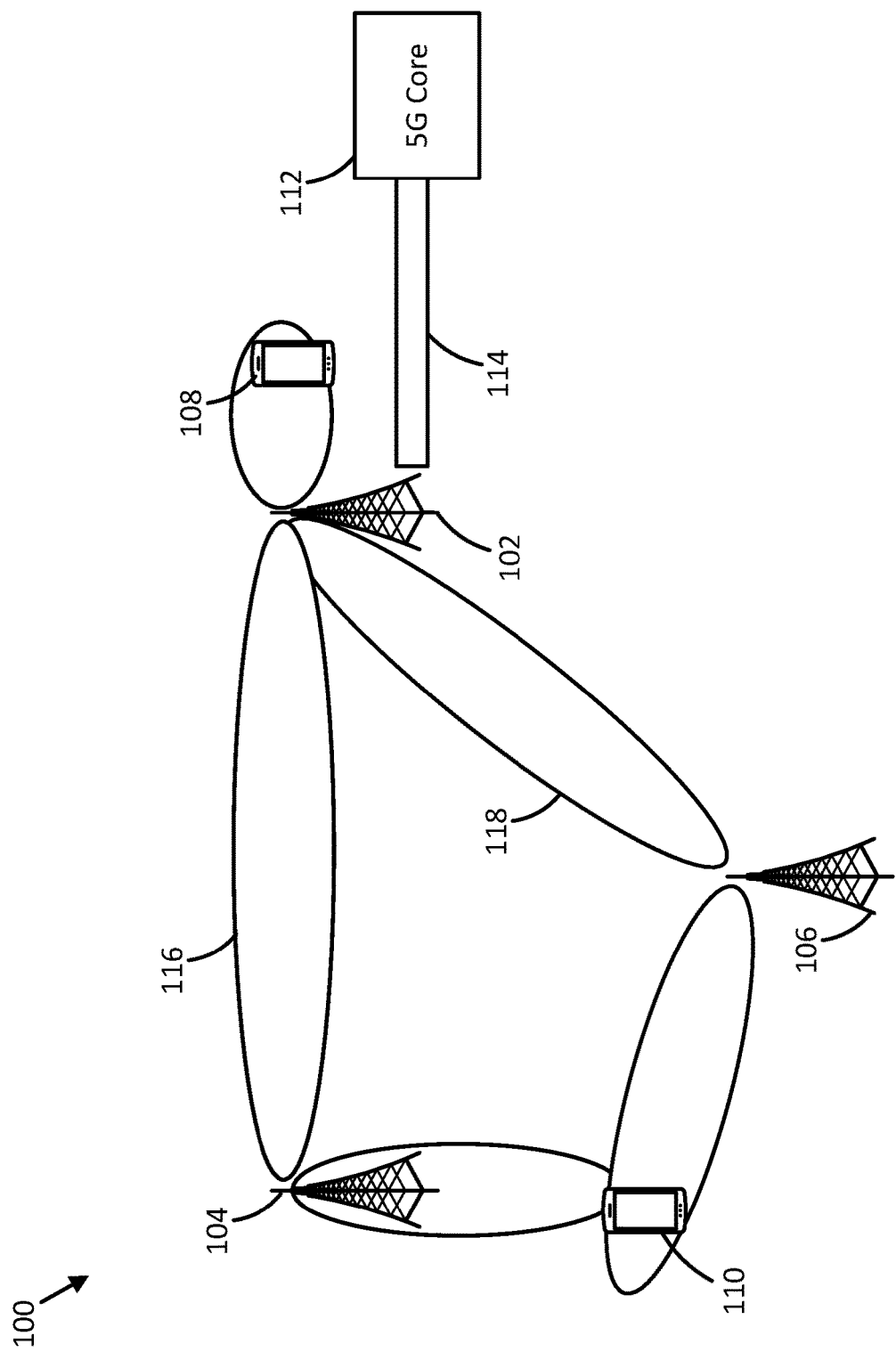
FIG. 1 illustrates an example network arrangement in accordance with some of the embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "LIE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

As fifth generation (5G) networks have developed, different arrangements of networks with different features have been implemented. FIG. 1 illustrates an example network arrangement 100 in accordance with some of the embodiments. The network arrangement 100 may implement one or more of the approaches described throughout this disclosure.

The network arrangement 100 may include one or more nodeBs in embodiments. For example, the network arrangement 100 includes a first nodeB 102, a second nodeB 104, and a third nodeB 106 in the illustrated embodiment. The nodeBs may be next generation nodeBs (gNBs) in some embodiments. Each of the nodeBs may provide service for one or more user equipments (UEs), such as cellular phones, smart phones, smart watches, and/or other electronics that can make use of a cellular network (such as a 5G network). For example, the first nodeB 102 can service a first UE 108, and the second nodeB 104 and the third nodeB 106 can service a second UE 110 in the illustrated embodiment. The UEs may develop a wireless connection with the nodeBs, and communications may be exchanged between the UEs and the nodeBs.

The network arrangement 100 may further include a 5G core 112. The 5G core 112 may provide services to the nodeBs (such as facilitating the routing of calls of the UEs serviced by the nodeBs across a public switched telephone network). In legacy networks, connections between the nodeBs and a 5G core were limited to a hardwired connection, such as a fiber backhaul connection. For example, a regular millimeter wave (mmwave) deployment will need Fiber backhaul in order to carry traffic at new radio (NR) speeds. However, laying fiber backhaul between the nodeBs and the 5G core can be expensive. For coverage with mmwave, a lot of such nodeBs may be deployed. Accordingly, the consideration of how can fiber backhauls be deployed at the same rate as the increase in nodeBs is presented. Integrated access and backhaul (IAB) suggests to use NR as backhaul in order for deployments to be rapid and dense. For example, wireless relays (where "wireless relays" may refer to wireless relays or wireless backhauls) may be utilized to provide connections between the nodeBs and a 5G core. That way, a UE can take advantage of mmwave deployment. Multi-hop topologies fix improving reliability of IAB nodes has also been approved.

In some embodiments, the data plane may be split into the centralized unit (CU)/distributed unit (DU) splits that can be achieved in NR. Both standalone (SA) and non-standalone (NSA) (for the NR access part) architectures may be supported. The link now may be split into "Access" and "Backhaul"-Intra UE module switching. Inter UE Duplexing may be introduced between IAB Node transmission (Tx) and reception (Rx) or have to use different frequencies operation for this purpose. Both can lead to backhaul interference to UEs is a high, and/or scheduling becomes complex.

Figure 2:
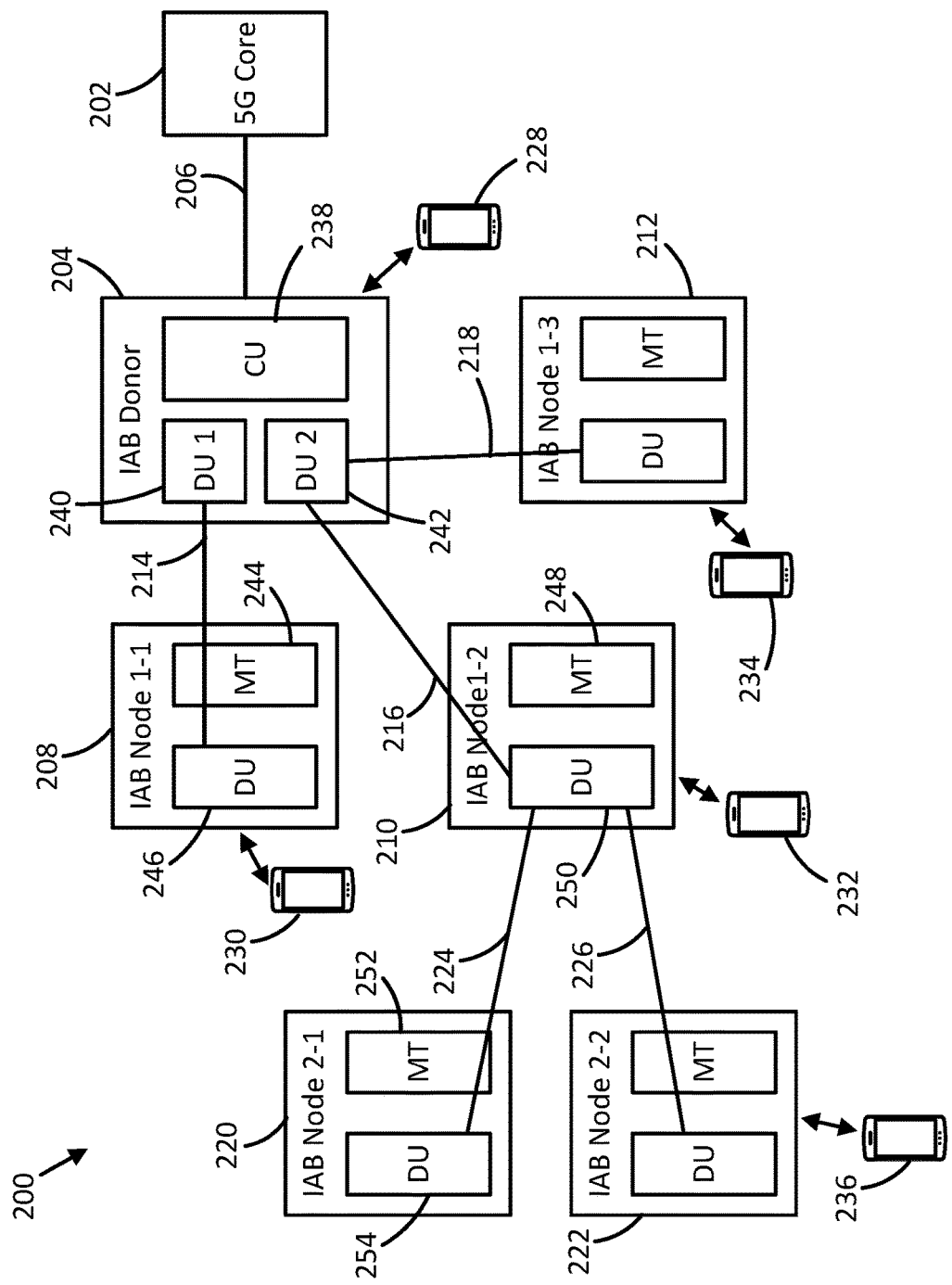
FIG. 2 illustrates an example detailed network arrangement in accordance with some embodiments.

The network arrangement 100 illustrates an example of NR backhaul that may be implemented for connecting one or more DUs of nodeBs to a 5G core. For example, a DU of the first nodeB 102 may be coupled to the 5G core 112 by a fiber backhaul 114 through the CU. However, a DU of the second nodeB 104 and a DU of the third nodeB DU 106 may not have a fiber backhaul connection to the 5G core 112 for a variety of reasons, such as the cost and/or complexity of providing backhaul connections between the second nodeB 104, the third nodeB 106, and the fiber backhaul connection. Rather than having the fiber backhaul connection, nodeBs without the fiber backhaul may be connected to a nodeB having a fiber backhaul to the 5G via a wireless relay to provide a connection to the 5G. For example, the second nodeB 104 may be connected to the first nodeB 102 via a wireless relay 116, and the third nodeB 106 may be connected to the first nodeB 102 via a wireless relay 118 in the illustrated embodiment. The services of the 5G core 112 may be provided to the second nodeB 104 and the third nodeB 106 via the wireless relay 116 and the wireless relay 118, respectively, FIG. 2 illustrates an example detailed network arrangement 200 in accordance with some embodiments. In particular, the network arrangement 200 may illustrate an IAB network that implements wireless relay connections for one or more nodeBs, which may be referred to as "nodes."

The network arrangement 200 may include a 5G core 202. The 5G core 202 may include one or more of the features of the 5G core 112 (FIG. 1). The network arrangement 200 may further include an IAB donor 204. The IAB donor 204 may be a nodeB that is connected to the 5G core by a fiber backhaul 206. The IAB donor 204 may provide a connection to the 5G core 202 to one or more other nodes via wireless relays.

The network arrangement 200 may further include one or more first-level IAB nodes. The first-level IAB nodes may be nodeBs that may connect directly to the IAB donor via wireless relays for connecting to the 5G core. The first-level IAB nodes may be referred to as child nodes of the IAB donor to which they are connected, and the IAB donor may be referred to as a parent of the child nodes. In the illustrated embodiment, the network arrangement 200 may include a first IAB node 208, a second IAB node 210, and a third IAB node 212 that are first-level IAB nodes. The first IAB node 208 may be connected directly to the IAB donor 204 via a wireless relay 214, where the wireless relay 214 may provide the services of the 5G core 202 to the first IAB node 208. The second IAB node 210 may be connected directly to the IAB donor 204 via a wireless relay 216, where wireless relay 216 may provide the services of the 5G core 202 to the second IAB node 210. The third IAB node 212 may be connected directly to the IAB donor 204 via a wireless relay 218, where the wireless relay 218 may provide the services of the 5G core 202 to the third IAB node 210.

The network arrangement 200 may further include one or more second-level IAB nodes. The second-level IAB nodes may be connected to an IAB donor through first-level IAB nodes. The second-level IAB nodes may connect to the first-level IAB nodes via wireless relays for connecting to the 5G core. The second-level IAB nodes may be referred to as child nodes of the first-level IAB nodes to which they are connected and/or the IAB donor to which they are connected through the first-level IAB nodes, and the first-level IAB nodes and/or the IAB donor may be referred to as a parent to the child nodes. In the illustrated embodiment, the network arrangement 200 may include a fourth IAB node 220 and a fifth IAB node 222 that are second-level IAB nodes. The fourth IAB node 220 may be connected to the second IAB node 210 via a wireless relay 224, which the second IAB node 210 may in turn connect the fourth IAB node 220 to the IAB donor 204. The fifth IAB node 222 may be connected to the second IAB node 210 via a wireless relay 226, which the second IAB node 210 may in turn connect the fifth IAB node 222 to the IAB donor 204. While two levels of IAB nodes are described in relation to the illustrated example, it should be understood that there may be more or less levels of IAB nodes in other embodiments, where the level of the IAB nodes may be defined based on the number of hops between the node and the IAB donor or the 5G core.

Each of the IAB donors and/or the IAB nodes may provide service to one or more UEs. For example, the IAB donor 204 provides service to a first UE 228, the first IAB node 208 provides service to a second UE 230, the second IAB node 210 provides service to a third UE 232, the third IAB node 212 provides service to a fourth UE 234, and the fifth IAB node 222 provides service to a fifth UE 236 in the illustrated embodiment. The UEs may include one or more of the features of the UEs described in relation to FIG. 1.

Each IAB donor may include a centralized unit (CU) for providing the basic functionality for a control plane (CP) and one or more distributed units (DUs) for providing functionality related to user plane (UP) traffic. Each of the IAB nodes may include a DU for UP traffic and a mobile termination (MT) for communication with the CU. For example, the IAB donor 204 may include a CU 238 to provide the basic functionality for the CP, and a first DU 240 and a second DU 242 for UP traffic in the illustrated embodiment. The first IAB node 208 may include a MT 244 for communication with the CU and a DU 246 for UP traffic in the illustrated embodiment. The DU 246 of the first IAB node 208 may connect to the first DU 240 of the IAB donor 204 to provide for UP traffic. The second IAB node 210 may include a MT 248 for communication with the CU and a DU 250 for UP traffic in the illustrated embodiment. The DU 250 of the second IAB node 210 may connect to the second DU 242 of the IAB donor 204 to provide for UP traffic.

The DUs and MTs of the second-level IAB nodes (and higher level IAB nodes) may communicate with the DUs and MTs of the parent node or nodes to communicate with the DUs and CU of the IAB donor. For example, the fourth IAB node 220 may include a MT 252 and a DU 254. The MT 252 of the fourth IAB node 220 may communicate with the MT 248 of the second IAB node 210 to in turn communicate with the CU 238 of the IAB donor 204. The DU 254 of the fourth IAB node 220 may communicate with the DU 250 of the second IAB node 210 to in turn communicate with the second DU 242 of the IAB donor 204. The DUs and the CU 238 of the IAB donor 204 may provide the functionalities of the 5G core 202 to the IAB nodes connected to the DUs and the CU 238.

For FIG. 2, fourth IAB Node 254 and fifth IAB node 222 are child nodes for parent second IAB Node 210. CUs of the IAB donor node and the IAB nodes typically provide for the basic functionality for control plane. CU may include centralized unit-control plane (CU-CP), centralized unit-user plane (CU-UP) and other necessary functionality. DU functionality may be extended through this other node for user plane (UP) traffic. And a method to communicate to CU may also be utilized. New functionality for next generation nodeB (gNB) to communicate to CU may be called mobile termination (MT). The same control plane features may be used here similar to regular UEs. All UE procedures from cell selection to radio link failures (RLFs) may be applicable here.

Figure 3:
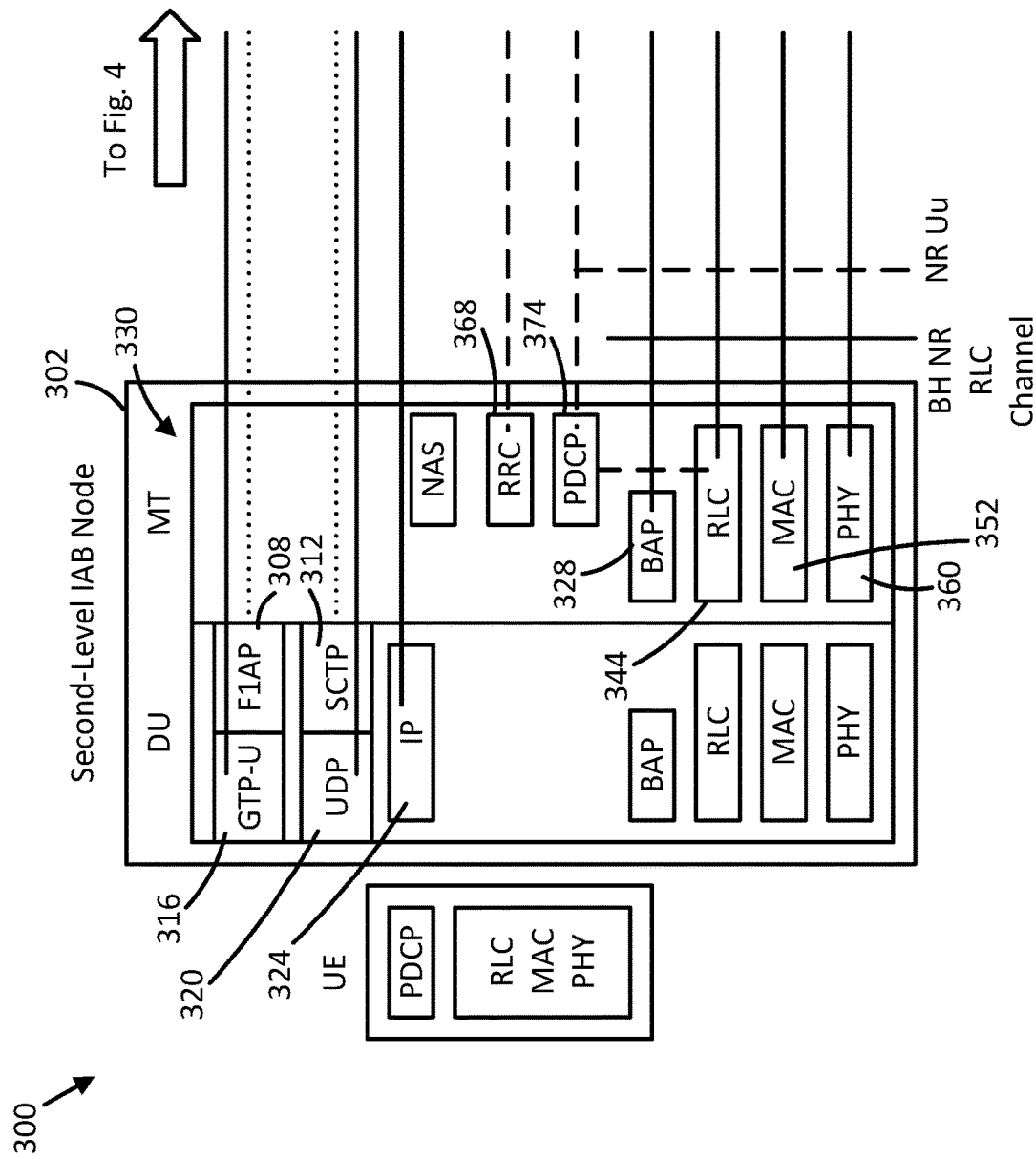
FIG. 3 illustrates a first portion of an example protocol stack arrangement in accordance with some embodiments.
Figure 4:
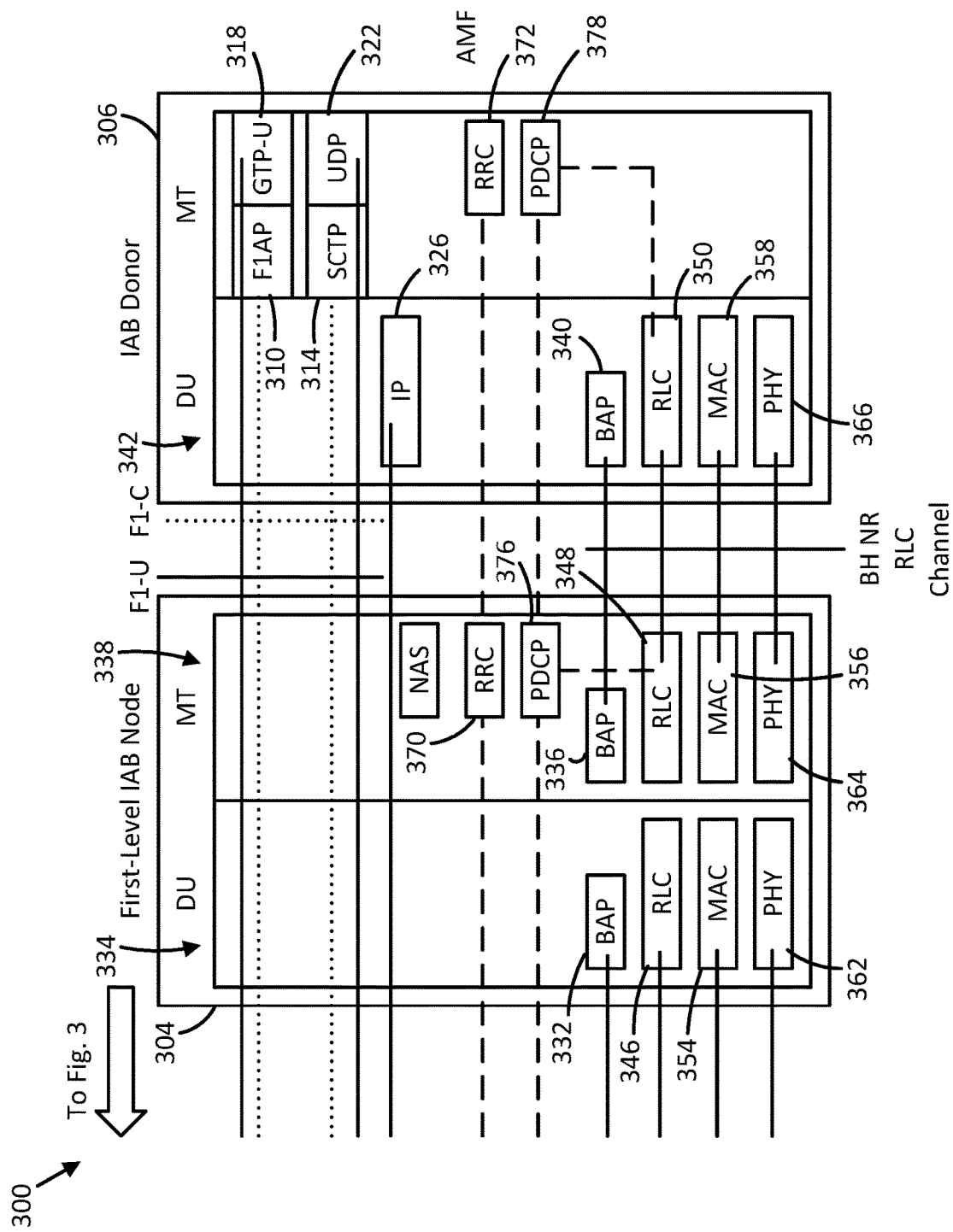
FIG. 4 illustrates a second portion of the example protocol stack arrangement in accordance with some embodiments.

FIG. 3 illustrates a first portion of an example protocol stack arrangement 300 in accordance with some embodiments. FIG. 4 illustrates a second portion of the example protocol stack arrangement 300 in accordance with some embodiments. For example, the protocol stack arrangement 300 may illustrate protocol stack changes that may be implemented for multi-level IAB networks (such as the multi-level IAB network illustrated in the network arrangement 200 (FIG. 2)). The protocol stack arrangement 300 illustrates the protocol stack for the support of F1 interface control plane (F1-C) protocol (shown in dotted lines), the protocol stack for the support of F1 interface user plane (F1-U) protocol (shown in solid lines), and the protocol stack for the support of IAB-MT's radio resource control (RRC) and non-access stratum (NAS) connections (shown in dashed lines) in accordance with some of the embodiments described herein. For example, the protocol stack arrangement 300 illustrates example protocol stack arrangements among a second-level IAB node 302, a first-level IAB node 304, and an IAB donor 306.

As shown in the protocol stack arrangement 300, the protocol stack for support of the F1-C protocol may include a connection from a F1 interface application (F1AP) component 308 within the second-level IAB node 302 to a HAP component 310 within the IAB donor 306. Further, the protocol stack may include a connection from a stream control transmission protocol (SCTP) component 312 within the second-level IAB node 302 to a SCTP component 314 within the IAB donor node 306. Accordingly, the protocol stack may terminate within the second-level IAB node 302 and the IAB donor node 306 without intermediate terminations within the first-level IAB node 304.

As shown in the protocol stack arrangement 300, the protocol stack for support of the F1-U protocol may include connections that terminate in the second-level IAB node 302 and the IAB donor 306 without terminations at the first-level IAB node 304, and other connections that terminate in the second-level IAB node 302 and the IAB donor 306 with intermediate terminations in the first-level IAB node 338. For example, the protocol stack may include a connection between a general packet radio service tunneling protocol user plane (GTP-U) component 316 of the second-level IAB node 302 and a GTP-U component 318 of the IAB donor. The protocol stack may further include a connection between a user datagram protocol (UDP) component 320 of the second-level IAB node 302 and a UDP component 322 of the IAB donor 306. Further, the protocol stack may include a connection between an interact protocol (IP) component 324 of the second-level IAB node 302 and an IP component 326 of the IAB donor 306. These connections may terminate in the second-level IAB node 302 and the IAB donor 306 without intermediate terminations in the first-level IAB node 304.

The protocol stack for support of the F1-U protocol may include a connection between a backhaul adaptation protocol (BAP) component 328 within an MT 330 of the second-level IAB node 302 and a BAP component 332 within a DU 334 of the first-level IAB node 304. The protocol stack may further include a connection between a. BAP component 336 within an MT 338 of the first-level IAB node 304 and a BAP component 342 within a DU 342 of the IAB donor 306. The protocol stack may include a connection between a radio link control (RLC) component 344 within the MT 330 of the second-level IAB node 302 and a RLC component 346 within a DU 334 of the first-level IAB node 304. The protocol stack may further include a connection between a RLC component 348 within the MT 338 of the first-level IAB node 304 and a RLC component 350 within the DU 342 of the IAB donor 306. The protocol stack may further include a connection between a medium access control (MAC) component 352 of the MT 330 of the second-level IAB node 302 and a MAC component 354 of the DU 334 of the first-level IAB node 304. The protocol stack may further include a connection between a MAC component 356 within the MT 338 of the first-level IAB node 304 and a MAC component 358 within the DU 342 of the IAB donor 306. The protocol stack may include a connection between a physical layer (PI-LY) component 360 within the MT 330 of the second-level IAB node 302 and a PHY component 362 within the DU 334 of the first-level IAB node 304. The protocol stack may further include a connection between a PHY component 364 within the MT 338 of the first-level IAB node 304 and a PHY component 366 within the DU 342 of the IAB donor 306. These connections may terminate in the second-level IAB node 302 and the IAB donor 306 with intermediate terminations in the first-level IAB node 304.

The protocol stack for support of the IAB-MT's RRC and NAC connections may include a connection among a radio resource control (RRC) component 368 of the second-level IAB node 302, an RRC component 370 of the first-level IAB node 304, and an RRC component 372 of the IAB donor 306. The protocol stack may include a connection among a packet data convergence protocol (PDCP) component 374 of the second-level IAB node 302, a PDCP component 376 of the first-level IAB node 304, and a PDCP component 378 of the IAB donor 306. The protocol stack may further include a connection between the PDCP 374 of the second-level IAB node 302 and the RLC component 344 within the MT 330 of the second-level IAB node 302. The protocol stack may further include a connection between the PDCP 376 of the first-level IAB node 304 and the RLC component 348 within the MT 338 of the first-level IAB node 304. Further, the protocol stack may include a connection between the PDCP 378 of the IAB donor 306 and the RLC 350 within the DU 342 of the IAB donor 306.

Some radio access network group 2 (RAN2) and radio access network group 3 (RAN3) topics are provided. FIG. 5 illustrates some example topology adaptation enhancements 500 in accordance with some embodiments. The topology adaptation enhancements 500 may have been agreed on by RAN2 and RAN3. The topology adaptation enhancements 500 may include: 1) specification of procedures for inter-donor IAB-node migration to enhance robustness and load-balancing, including enhancements to reduce signalling load; 2) specification of enhancements to reduce service interruption due to IAB-node migration and backhaul (BH) RLF recovery; and 3) specification of enhancements to topological redundancy, including support of CP/UP separation.

Some agreements on topology adaptation discussions have been made. For a first agreement, release 17 (Rel-17) IAB work will comprise of agreeing to mechanisms and protocol definitions to ensure proper load balancing between different IAB nodes, reducing service interruption due to failure events (such as RLF) and ensure mechanisms of topological redundancy are in place to react to connectivity failures. For a second agreement, as part of RAN2/3 agreements, baseline mechanisms of release 16 (Rel-16) of RRC re-establishments, conditional handovers, and dual active protocol stack are to be further explored as potential approaches.

Figure 6:
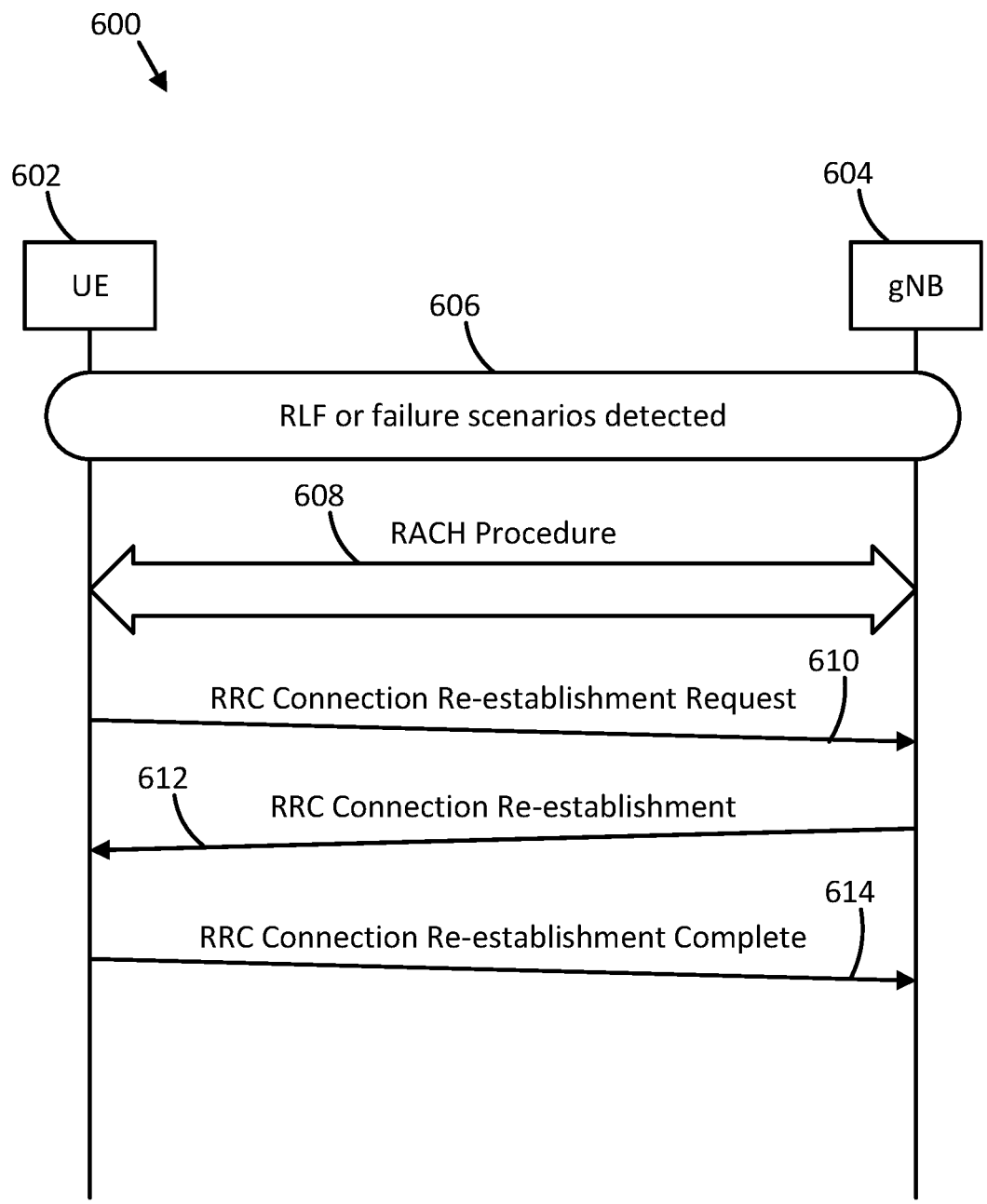
FIG. 6 illustrates an example radio resource control re-establishment flow for radio link failure in accordance with some embodiments.

RRC re-establishment, RLF call flow and issues with IAB adaptation are provided in relation to FIG. 6. FIG. 6 illustrates an example RRC re-establishment flow 600 for RLF in accordance with some embodiments. The RRC re-establishment flow 600 illustrates example operations between a UE 602 and a gNB 604. The RRC re-establishment flow 600 may include a RLF or failure scenario being detected 606. A random access channel (RACH) procedure 60S may be initiated based on the RLF or failure scenario being detected. The UE 602 may transmit an RRC connection re-establishment request 610 to the gNB 604 requesting RRC connection establishment with the gNB 604. The gNB 604 may respond with an RRC connection re-establishment message 612 based on an RRC connection being established between the UE 602 and the gNB 604. The UE 602 may then transmit an RRC connection re-establishment complete message 614 to the gNB 640 to indicate that the RRC connection has been completed.

IAB topology adaptation may present issues. Some issues for IAB topology adaptation associated with the RRC re-establishment flow 600 may include: 1) Though the IAB topology can be used as is, the interruption time might not be sustainable since the impact of the RLF is not only on the IAB node but all its dependent child nodes as well; 2) In case of parent IAB node change, the parent node needs to have enough capacity to be able to handle all the child IAB nodes and incoming UEs. If the parent node is unable to handle the capacity of the incoming nodes; the Re-establishment might fail leading to a RRC Connection Establishment procedure adding further to the delay of the overall procedure; 3) Even with an early resource reservation mechanism it is difficult to predict how many child nodes have to be moved in preparation for the handover; and 4) An access link failure completely makes the RRC Reestablishment procedure useless.

Figure 7:
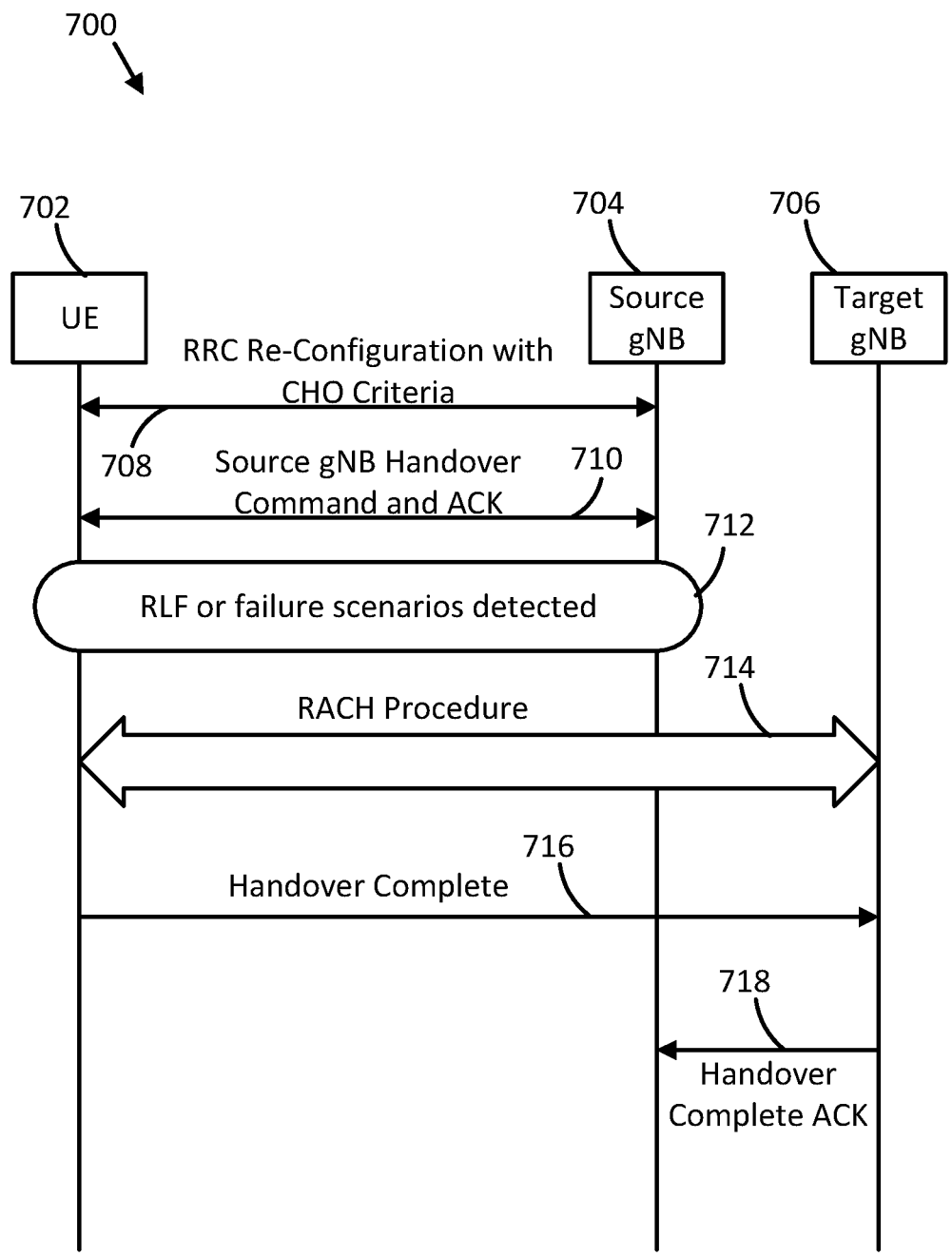
FIG. 7 illustrates an example radio resource control radio link failure call flow in accordance with some embodiments.

Conditional handover (CHO), RLF call flow and issues with IAB adaptation are provided in relation to FIG. 7. FIG. 7 illustrates an example RRC RLF call flow 700 in accordance with some embodiments. The RRC RLF call flow 700 illustrates example operations among a UE 702, a source gNB 704, and a target gNB 706. The RRC RLF call flow may include RRC re-configuration with CHO criteria messages 708 being exchanged between the UE 702 and the source gNB 704. Further, source gNB handover command and acknowledgement (ACK) 710 may be exchanged between the UE 702 and the source gNB 704. The RRC RLF call-flow 700 may include RLF or failure scenarios being detected 712. A RACH procedure 714 may occur between the UE 702 and the target gNB 706 based on the detection of the RLF or failure scenarios. The UE 702 may transmit a handover complete message 716 to the target gNB 706 to indicate that the handover has been completed. The target gNB 706 may transmit a handover complete ACK message 718 to the source gNB 704 to acknowledge the handover has been completed.

Some issues for IAB topology adaptation associated with the RRC RLF call flow 700 may include: 1) Interruption time is reduced in terms of finding the target gNB; 2) However, in case of failure of the handover complete, the second target gNB is tried and so on and so forth . . . though better than reestablishment, delay still exists; 3) Target gNB could reject the incoming UE due to the lack of the capacity to handle the descendant IAB Nodes and UEs; 4) Access link failure will cause CHO to fail similar to RRC Re-establishment; and 5) Prediction and reservation of resources needed for a successful handover is not easy to implement.

Figure 8:
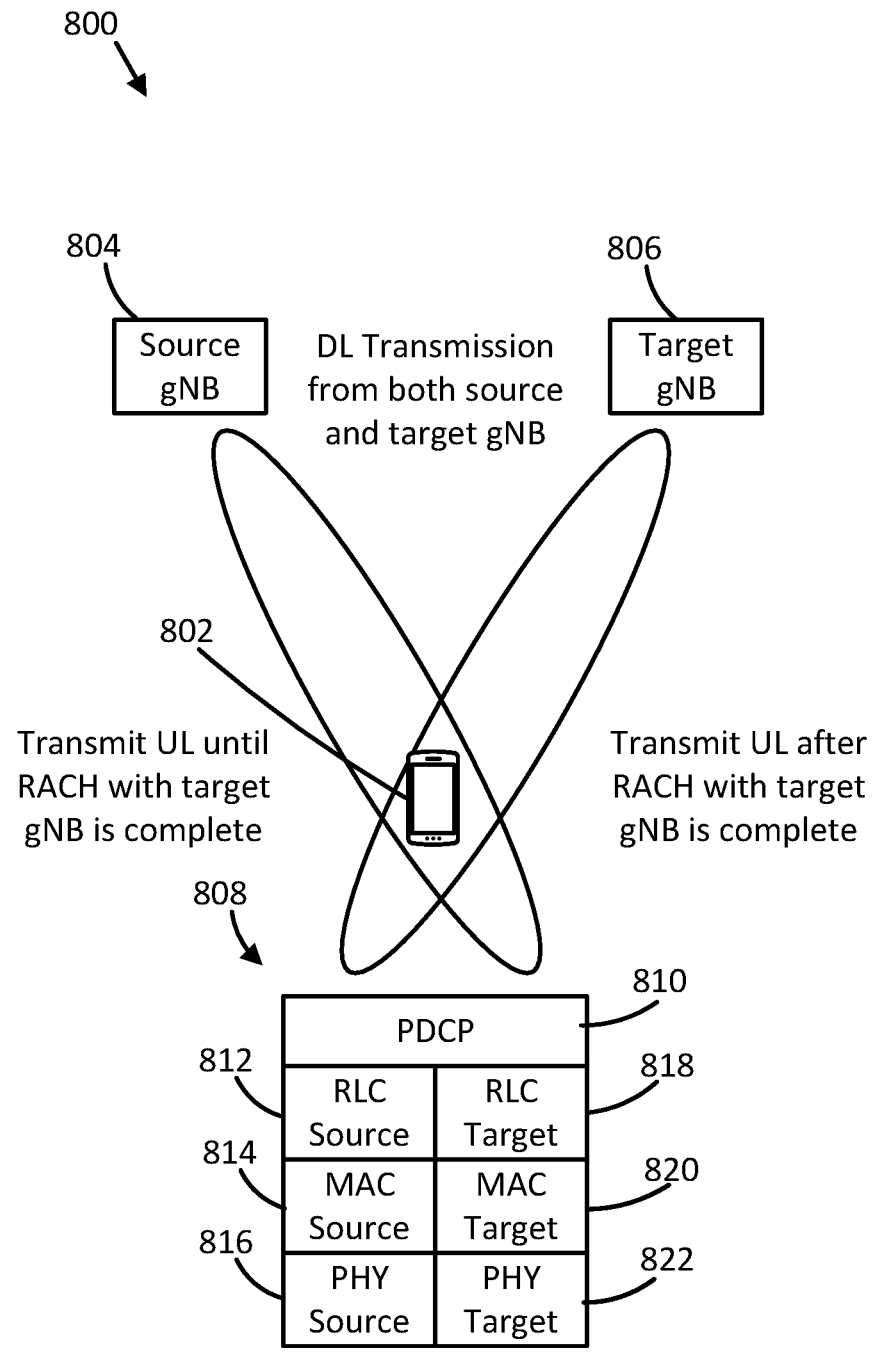
FIG. 8 illustrates an example dual access protocol stack radio link failure arrangement in accordance with some embodiments.

Dual access protocol stack (DAPS), REF call flow and issues with IAB adaptation are provided in relation to 8. FIG. 8 illustrates an example DAPS RLF arrangement 800 in accordance with some embodiments. The DAPS REF arrangement 800 may include a UE 802, a source gNB 804, and a target gNB 806. The UE 802 may have connections established with both the source gNB 804 and the target gNB 806. The DAPS RLF arrangement 800 further illustrates an example DAPS 808 of the UE 802. The DAPS 808 may include a PDCP 810 that may be utilized for both the source gNB 804 and the target gNB 806. The DAPS 808 may include a source RLC 812, a source MAC 814, and a source PHY 816 that may be utilized for communication between the LIE 802 and the source gNB 804. The DAPS 808 may further include a target RLC 818, a target MAC 820, and a target PHY 822 that may be utilized for communication between the UE 802 and the target gNB 806. The UE 802 may receive downlink (DL) transmission from both the source gNB 804 and the target gNB 806. The UE 802 may transmit UL transmissions to the source gNB 804 until a RACH procedure with the target gNB 806 is completed. After the RACH procedure with the target gNB 806 is completed, the UE 802 may transmit UL transmissions to the target gNB 806.

Some issues for IAB topology adaptation associated with the DAPS RLF arrangement 800 may include: 1) There is only one packet data convergence protocol (PDCP) stack in IAB networks at the Donor CU; and 2) All IAB Nodes operate at the radio link control (RLC) layer for which DAPS is not defined.

Figure 9:
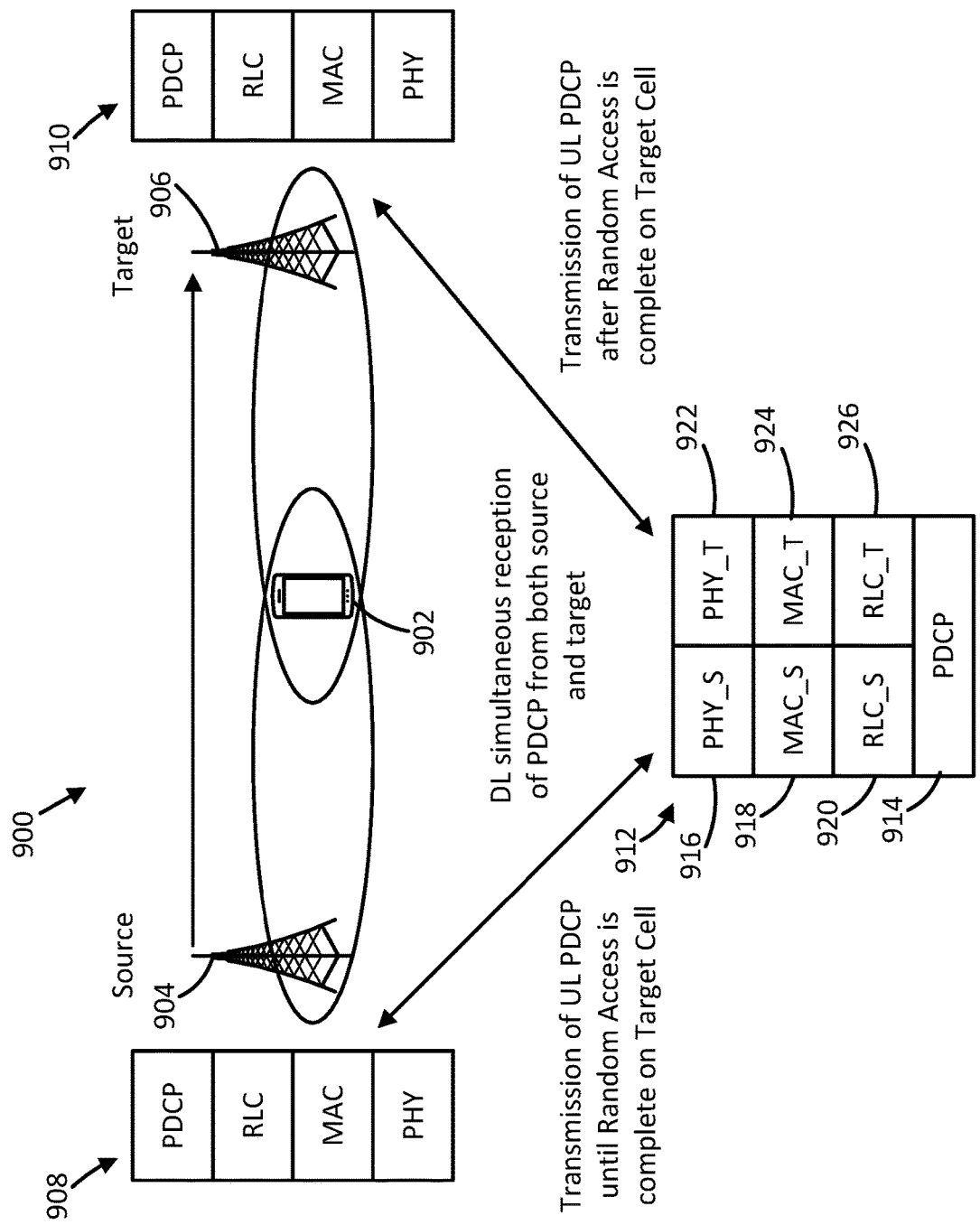
FIG. 9 illustrates an example dual access protocol stack handover arrangement for a user equipment in accordance with some embodiments.

FIG. 9 illustrates an example DAPS handover arrangement 900 for a UE in accordance with some embodiments. The DAPS handover arrangement 900 may illustrate a DI, only handover scenarios at PDCP. The DAPS handover arrangement 900 may include a UE 902, a source gNB 904, and a target gNB 906. The UE 902 may have connections established with both the source gNB 904 and the target gNB 906. The DAPS handover arrangement 900 illustrates a stack 908 of the source gNB 904 and a stack 910 of the target gNB 906. The DAPS handover arrangement 900 further illustrates a DAPS 912 of the UE 902. The DAPS 912 may include a PDCP 914 that may utilized for communication with both the source gNB 904 and the target gNB 906. The DAPS 912 may further include a source PHY 916, a source MAC 918, and a source RLC 920 that may be utilized for communication with the source gNB 904. Further, the DAPS 914 may include a target PHY 922, a target MAC 924, and a target RLC 926 that may be utilized for communication with the target gNB 906. The UE 902 may have DL simultaneous reception of PDCP from both the source gNB 904 and the target gNB 906. The UE 902 may transmit UL PDCP transmissions to the source gNB 904 until random access is complete on a target cell operated by the target gNB 906. After the random access with the target gNB 906 is completed, the UE 902 may transmit UL PDCP transmissions to a target cell operated by the target gNB 906.

RLF and Handover Approaches

Figure 10:
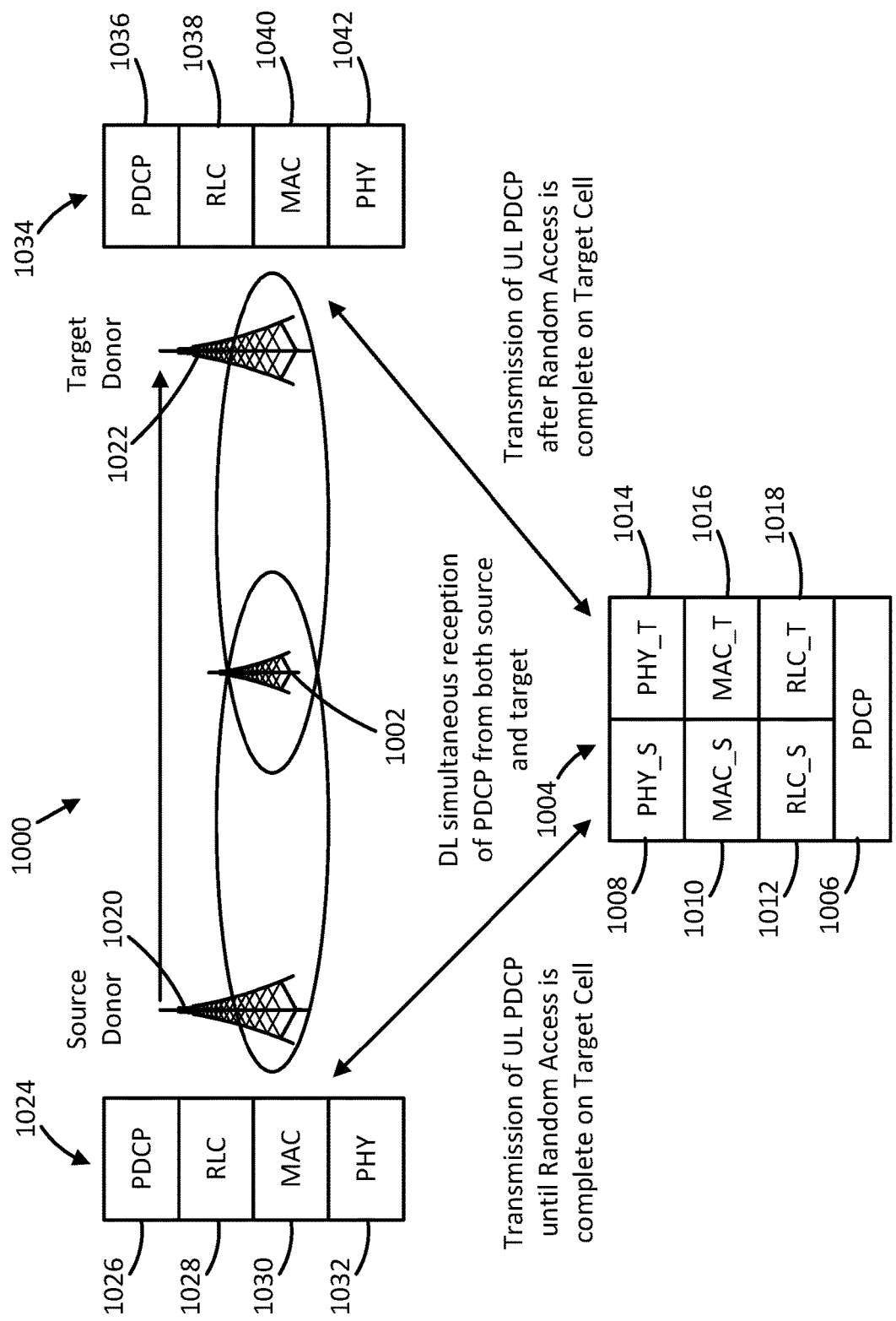
FIG. 10 illustrates an example integrated access and backhaul arrangement in accordance with some embodiments.
Figure 11:
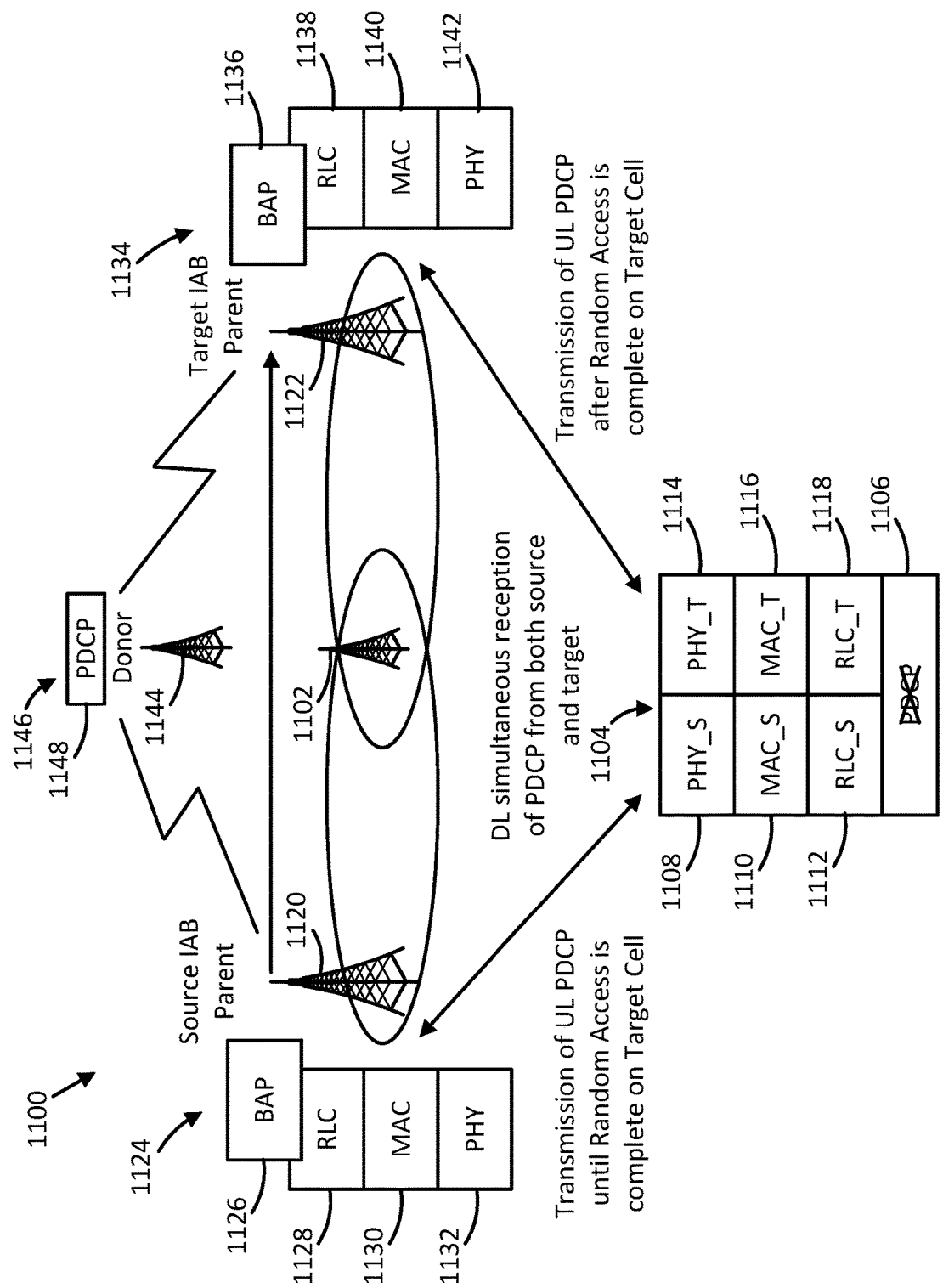
FIG. 11 illustrates an example integrated access and backhaul arrangement in accordance with some embodiments.

An approach for DAPS with IAB, for both inter and intra donor is described and illustrated in relation to FIG. 10 and FIG. 11. For example, FIG. 10 illustrates an example IAB arrangement 1000 in accordance with some embodiments. In particular, the IAB arrangement 1000 illustrates an example arrangement with an IAB node having a DAPS and capable of establishing connections with multiple IAB parent nodes at a time, where the IAB parent nodes may be donor nodes in the illustrated embodiment. A handover described in relation to the IAB arrangement 1000 may be an inter donor handover as an IAB node is being handed over for one donor node to another donor node.

The IAB arrangement 1000 may include a IAB node 1002. The IAB node 1002 may include one or more of the features of the IAB nodes described in relation to FIG. 2 and/or the IAB nodes described in relation to FIG. 3 and FIG. 4. The IAB node 1002 may implement a DAPS 1004 that allows the IAB node 1002 to establish connections with multiple IAB donor nodes at a time. For example, the DAPS 1004 may facilitate connections between the IAB node 1002 and two IAB donor nodes at a same time in the illustrated embodiment. The DAPS 1002 may include a PDCP 1006 that can be utilized by the IAB node 1002 to communicate with both the IAB donor nodes. The DAPS 1002 may further include a source PHY 1008, a source MAC 1010, and a source PIC 1012 that can be utilized by the IAB node 1002 to communicate with a first IAB donor. Further, the DAPS 1002 may include a target PHY 1014, a target MAC 1016, and a target RLC 1018 that can be utilized by the IAB node 1002 to communicate with a second IAB donor.

The IAB arrangement 1000 may further include one or more IAB donor nodes to which the IAB node 1002 can connect. Each of the IAB donor nodes may include one or more of the features of the IAB donor 204 (FIG. 2) and/or the IAB donor 306 (FIG. 3). The IAB arrangement 1000 includes a source donor node 1020 and a target donor node 1022 in the illustrated embodiment.

Each of the IAB donor nodes may have a stack that can be utilized for communicating with the IAB donor node. For example, the source donor node 1020 may have a stack 1024 that allows other nodes and/or UEs to communicate with the source donor node 1020. The stack 1024 may include a PDCP 1026, an RIX 1028, a MAC 1030, and a. PHY 1032. The target donor node 1022 may have a stack 1034 that allows other nodes and/or UEs to communicate with the target donor node 1022. The stack 1034 may include a PDCP 1036, an RLC 1038, a MAC 1040, and a PHY 1042.

The IAB node 1002 may utilize the DAPS 1004 to establish connections with the source donor node 1020 and the target donor node 1022. For example, the IAB node 1002 may utilize the PDCP 1006 of the DAPS 1004 for communication with the source donor node 1020 via the PDCP 1026 of the stack 1024 and the target donor node 1022 via the PDCP 1036 of the stack 1024. Further, the IAB node 1002 may utilize the source PHY 1008, the source MAC 1010, and the source RLC 1012 for communication with the source donor node 1020 via the PHY 1032, the MAC 1030, and the RLC 1028, respectively, of the stack 1024. The IAB node 1002 may utilize the target PHY 1014, the target MAC 1016, and the target RLC 1018 for communication with the target donor node 1022 via the PHI 1042, the MAC 1040, and the RLC 1038, respectively, of the stack 1034.

In the illustrated embodiment, the IAB node 1002 may initially be connected to the source donor node 1020 as a master node and the target donor node 1022 as a secondary node. The connection to both the source donor node 1020 and the target donor node 1022 may allow the IAB node 1002 DL simultaneous reception of PDCP from both the source donor node 1020 and the target donor node 1022. When the IAB node 1002 is connected to the source donor node 1020 as the master node, the IAB node 1002 may transmit UL PDCP transmissions to the source donor node 1020. The IAB node 1002 may be handed over to the target donor node 1022 at some point to change the target donor node 1022 to the master node for the IAB node 1002. The handover of the IAB node 1002 to the target donor node 1022 may occur in response to a RLF or failure scenario between the IAB node 1002 and the source donor node 1020, or another reason that the target donor node 1022 should be operating as a master node of the IAB node 1002. The handover of the IAB node 1002 from the source donor node 1020 to the target donor node 1022 may include a random access procedure to complete the handover. Once the random access procedure of the handover has been completed, the IAB node 1002 may transmit UL PDCP to the target donor cell 1022. Accordingly, the IAB node 1002 may have transmission of UL PDCP to the source donor node 1020 until random access is complete on a target cell operated by the target donor node 1022, and the IAB node 1002 may have transmission of UL PDCP to the target donor node 1022 after random access is complete on the target donor node 1022.

FIG. 11 illustrates an example IAB arrangement 1100 in accordance with some embodiments. In particular, the IAB arrangement 1100 illustrates an example arrangement with an IAB node having a DAPS and capable of establishing connections with multiple IAB parent nodes at a time, where the IAB node may be a second-level IAB node, the parent nodes may be a first-level IAB node, and the first-level IAB nodes may connect to a donor node in the illustrated embodiment. A handover described in relation to the IAB arrangement 1100 may be an intra donor handover as an IAB node is being handed over for first-level IAB node to another first-level IAB node.

The IAB arrangement 1100 may include a IAB node 1102. The IAB node 1102 may include one or more of the features of the IAB nodes described in relation to FIG. 2 and/or the IAB nodes described in relation to FIG. 3 and FIG. 4. The IAB node 1102 may implement a DAPS 1104 that allows the IAB node 1102 to establish connections with multiple IAB parent nodes at a time, where the IAB parent nodes may be first-level IAB nodes in the illustrated embodiment. For example, the DAPS 1104 may facilitate connections between the IAB node 1102 and two parent IAB nodes at a same time in the illustrated embodiment. The DAPS 1102 may include a source PHY 1108, a source MAC 1110, and a source RLC 1112 that can be utilized by the IAB node 1102 to communicate with a first IAB parent node. Further, the DAPS 1102 may include a target PHY 1114, a target MAC 1116, and a target RLC 1118 that can be utilized by the IAB node 1102 to communicate with a second IAB parent node. Due to the IAB node 1102 connecting to first-level IAB nodes rather than donor nodes, a PDCP may not be utilized by the IAB node 1102 for communication with the first-level level IAB nodes and a PDCP may be omitted from the DAPS 1102, as indicated by PDCP 1106 within the DAPS 1104 being crossed out.

The IAB arrangement 1100 may further include one or more IAB parent nodes to which the IAB node 1102 can connect, where the IAB parent nodes may be first-level nodes in the illustrated embodiments. Each of the IAB parent nodes may include one or more of the features of the IAB nodes described in relation to FIG. 2 and/or the IAB nodes described in relation to FIG. 3 and FIG. 4. For example, IAB arrangement 1100 may include a source IAB parent node 1120 and a target IAB parent node 1122 in the illustrated embodiment.

Each of the IAB parent nodes may have a stack that facilitates communication with one or more IAB child nodes and one or more donor nodes. For example, the source IAB parent node 1120 may have a stack 1124. The stack 1124 may include a BAP 1126, an RLC 1128, a MAC 1130, and a PHY 1132 that may facilitate communication among the source IAB parent node 1120, the IAB child nodes, and/or the donor nodes. The target IAB parent node 1122 may have a stack 1134. The stack 1134 may include a BAP 1136, an RLC 1138, a MAC 1140, and a PHY 1142 that may facilitate communication among the target IAB parent node 1122, the IAB child nodes, and/or the donor nodes.

The IAB arrangement may further include one or more IAB donor nodes. Each of the IAB donor nodes may include one or more of the features of the IAB donor 204 (FIG. 2) and/or the IAB donor 306 (FIG. 3). The IAB arrangement 1100 includes a donor node 1144 in the illustrated embodiment.

Each donor node may have a stack that can be utilized for communicating with the IAB donor node. For example, the donor node 1144 may include a stack 1146. The stack 1146 may include a PDCP 1148 that may facilitate communication among the donor node 1146 and IAB child nodes.

The IAB node 1102 may utilize the DAPS 1104 to establish connections with the source IAB parent node 1120 and the target IAB parent node 1122. For example, the IAB node 1102 may utilize the source PHY 1108, the source MAC 1110, and the source RLC 1112 for communication with the source IAB parent node 1120 via the PHY 1132, the MAC 1130, and the RLC 1128, respectively, of the stack 1124. The IAB node 1102 may utilize the target PHY 1114, the target MAC 1116, and the target RLC 1118 for communication with the target donor node 1122 via the PHY 1142, the MAC 1140, and the RLC 1138, respectively, of the stack 1134.

The source IAB parent node 1120 may utilize the stack 1124 to establish a connection with the donor node 1144 and the target IAB parent node 1122 may utilize the stack 1134 to establish a connection with the donor node 1144. For example, the source IAB parent node 1120 may utilize the BAP 1126 for communication with the donor node 1144 via the PDCP 1148 of the stack 1146. The target IAB parent node 1122 lay utilize the BAP 1136 for communication with the donor node 1144 via the PDCP 1148 of the stack 1146. When the IAB node 1102 is connected to the source IAB parent node 1120 and/or the target IAB parent node 1122, the source IAB parent node 1120 and/or the target IAB parent node 1122 may act as an intermediary and provide connection between the IAB node 1102 and the donor node 1144.

In the illustrated embodiment, the IAB node 1102 may initially be connected to the source IAB parent node 1120 as a master node and the target IAB parent node 1122 as a secondary node. The connection to both the source IAB parent node 1120 and the target IAB parent node 1122 may allow the IAB node 1102 DL simultaneous reception of PDCP from both the source IAB parent node 1120 and the target IAB parent node 1122. When the IAB node 1102 is connected to the source IAB parent node 1120 as the master node, the IAB node 1102 may transmit UL PDCP transmissions to the source IAB parent node 1120. The IAB node 1102 may be handed over to the target IAB parent node 1122 at some point to change the target IAB parent node 1122 to the master node for the IAB node 1102. The handover of the IAB node 1102 to the target IAB parent node 1122 may occur in response to a RLF or failure scenario between the IAB node 1102 and the source IAB parent node 1120, or another reason that the target IAB parent node 1122 should be operating as a master node of the IAB node 1102. The handover of the IAB node 1102 from the source IAB parent node 1120 to the target IAB parent node 1122 may include a random access procedure to complete the handover. Once the random access procedure of the handover has been completed, the IAB node 1102 may transmit UL PDCP to the target IAB parent cell 1122. Accordingly, the IAB node 1102 may have transmission of UL PDCP to the source IAB parent node 1120 until random access is complete on a target cell operated by the target IAB parent node 1122, and the IAB node 1102 may have transmission of UL PDCP to the target IAB parent node 1122 after random access is complete on the target IAB parent node H 22.

Inter donor handover may be straight forward since the termination is at the PDCP stacks at the source and target donors. But intra donor is not supported. There may be no PDCP Stack. UL may be supported since these are now next generation nodeB-distributed unit (gNB-DU) units unlike regular UEs.

Figure 12:
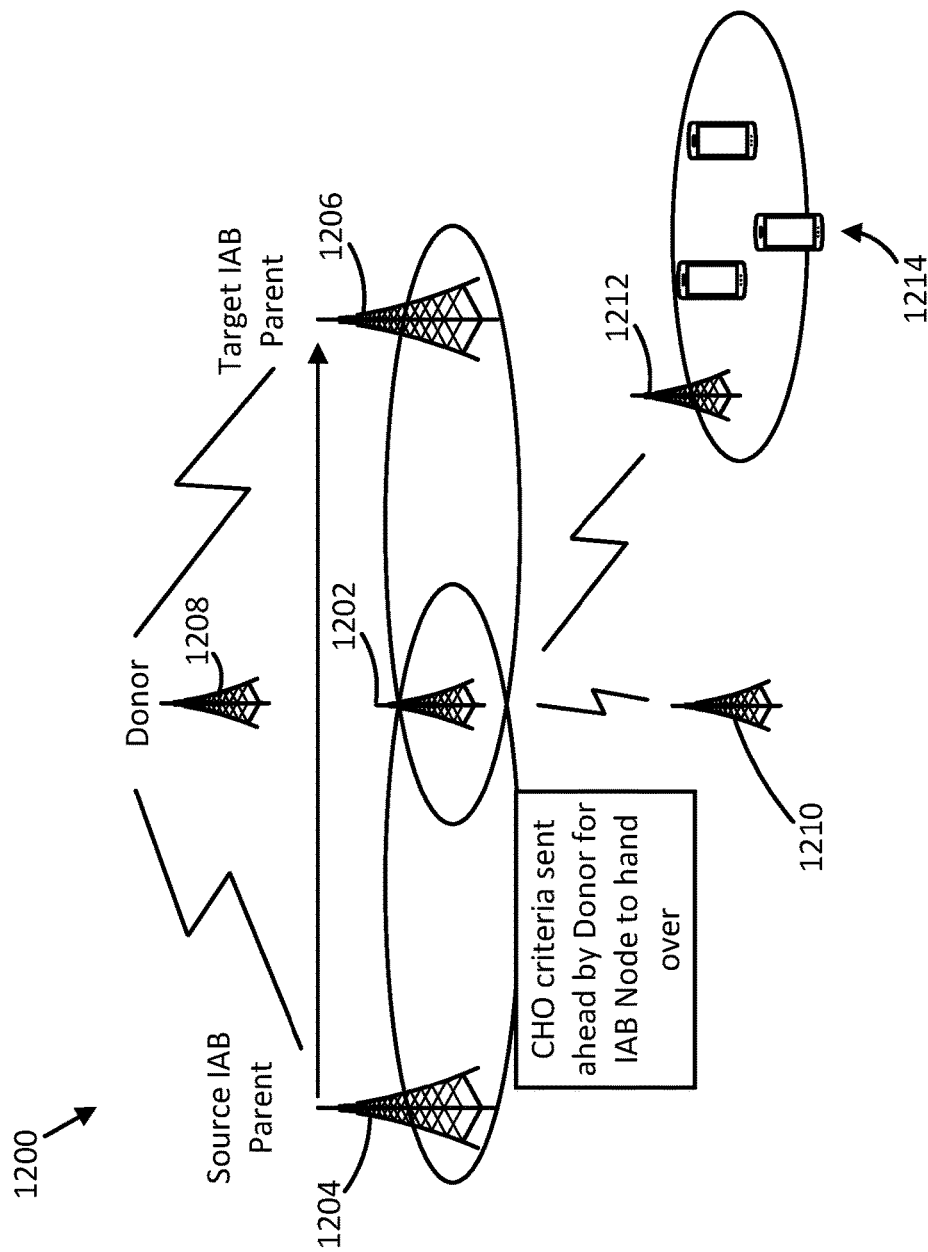
FIG. 12 illustrates an example integrated access and backhaul arrangement in accordance with some embodiments.

An approach for CHO for intra donor is described and illustrated in relation to FIG. 12. For example, FIG. 12 illustrates an example IAB arrangement 1200 in accordance with some embodiments, where the IAB arrangement 1200 may be utilized for illustrating an approach for intra donor CHO. CHO based handovers may be used. However, what happens to the child nodes and UEs. At the minimum security may be re-established. Without the knowledge of how many UEs until handover is complete the target IAB parent might not have the resources to handle all the incoming UEs. Might need resource pre-allocation mechanisms.

Alternately, if some form of DAPS can be introduced at another layer: similar to existing mechanisms, group mechanisms can be avoided. A common procedure for both inter and intra donor handovers may be allowed. At what layers can this new DAPS or DAPS-like be implemented may be for consideration.

For example, the IAB arrangement 1200 may include an IAB node 1202. The IAB node 1202 may be connected to a source IAB parent node 1204 and target IAB parent node 1206, where the source IAB parent node 1204 and the target IAB parent node 1206 may provide connection between the IAB node 1202 and a donor node 1208 with the source IAB parent node 1204 and the target IAB parent node 1206 being intermediate between the IAB node 1202 and the donor node 1208.

The IAB node 1202 may further be connected to one or more IAB child nodes and/or one or more UEs. The IAB node 1202 may act as a parent node to the IAB child nodes and/or the UEs, providing connection among the IAB child nodes, the UEs, and the donor node 1208. For example, the IAB node 1202 may be connected to a first IAB child node 1210 and a second IAB child node 1212. The IAB node 1202 may act as a parent node to the first IAB child node 1210 and the second IAB child node 1212, and provide a connection between the first IAB child node 1210 and the donor node 1208 and a connection between the second IAB child node 1212 and the donor node 1208. The second IAB child node 1212 may have connections to one or more UEs 1214 and may provide service to the UEs 1214.

In the illustrated embodiment, the IAB node 1202 may initially be connected to the source IAB parent node 1204 as a master node and the target IAB parent node 1206 as a secondary node. The IAB node 1202 may perform a CHO to change the target IAB parent node 1206 to be the master node. The donor node 1208 may provide CHO criteria to the source IAB parent node 1204 and the target IAB parent node 1206 for handover of the IAB node 1202. As the IAB node 1202 is handed over from the source IAB parent node 1204 to the target IAB parent node 1206, the first IAB child node 1210, the second IAB node 1212, and the UEs 1214 may be updated based on the handover of the IAB node 1202 to the target IAB parent node 1204. For example, stacks of the first IAB child node 1210, the second IAB child node 1212, and the UEs 1214 may need to be updated due to the handover of the IAB node 1202 to the target IAB parent node 1204.

IAB RLF and handover issues addressed by approaches described herein can include: Can DAPS be extended to other protocol layers for intra donor (handover scenarios under same donor) which currently plan to use CHO mechanisms? Can DAPS be extended to include UL since IAB nodes are network nodes? Added advantage for non-terrestrial network (NTN) handover scenarios and sidelink (SL) Relay (as needed). Can CHO be enhanced for better performance? Can new radio-dual connectivity (NR-DC) be applied without changes?

Approaches to handover an IAB node to another IAB parent node or donor node may include a DAPS-like at BAP approach, a DAPS-like at RLC approach, an NR-DC approach, and a CHO approach. The DAPS-like at RAP approach may be any of the DAPS approaches described herein implemented at the BAP. The DAPS-like at RLC approach may be any of the DAPS approaches described herein implemented at the RLC. The NR-DC approach may be any of the NR-DC approaches described herein. The CHO approach may be any of the CHO approaches described herein.

The DAPS-like at BAP approach may present a small amount of service interruption at the UE, may do a good job of congestion/load handling at network during handover, may have good procedure robustness, may present complex network handover state maintenance, and the changes needed for UL dual connectivity during handovers could be complex. The DAPS-like at BAP approach may present the advantages of bi-directional being simpler compared to DAPS-like at RLC, may not need to handle group handovers for descendant IAB nodes and UES, and the same procedure can be used for both intra and inter donor handovers. However, the DAPS-like at BAP approach may present the issues of needing a full sequence numbering implementation of PDCP at BAP in order to track what packets are sent and what packets are received for handovers, state maintenance per RLC may be reduced in case of 1 to N mapping (N being a number greater than one), and major rediscussions and implementation at the protocol layer.

The DAPS-like at RLC approach may present a small amount of service interruption at the UE, may do a good job of congestion/load handling at network during handover, may have good procedure robustness, may present complex network handover state maintenance, and the changes needed for UL dual connectivity during handovers could be complex. The DAPS-like at RLC approach may present the advantages of not needing to handle group handovers of child IAB nodes and UEs, and the same procedure may be utilized to handle both intra and inter donor handovers. The DAPS-like RLC approach may present the issues of maintenance of the full state of RLC at different nodes and for different configurations, the same state maintenance is needed for 1:N and 1:1 mappings (where in N is a number greater than 1), further negative acknowledged (NAK) state also needs to be maintained, and protocol changes needed at RLC and also specification impact needs to be separated out for DAPS at RIX for networks and UEs.

The NR-DR approach may present a medium amount of service interruption at the UE, may be complex to deal with congestion/load handling at network during handover, may have good procedure robustness, network handover state maintenance may not be needed, and the changes for UL dual connectivity during handovers may be good (for example, few or no changes are needed). The NR-DR approach may present advantages of the existing mechanism may be applied without any changes to the specification, and the same procedure, if available, can handle intra and inter donor procedures. The NR-DR approach may present issues of needing a dual connectivity (DC) configuration which might not be available at all times, and descendant IAB nodes and UEs may still need to be handled.

The CHO approach may present a large amount of service interruption at the UE, may be complex to deal with congestion/load handling at network during handovers, may have medium procedure robustness, network handover state maintenance may not be needed, and the changes for UL dual connectivity during handovers may be good (for example, few or no changes are needed). The CHO approach may present advantages of existing mechanism may be applied without any changes to the specification, and the same procedure can handle both intra and inter donor procedures. The CHO approach may present issues of complexities in handling descendant IAB nodes and UEs.

An enhanced DAPS (eDAPS), DAPS-like protocol at BAP approach may be applied in some embodiments to address possible weaknesses of the DAPS-like at BAP approach described above. For a 1 to 1 mapping, BAP layer may map the individual sequence number for the traffic carried through the data radio bearers (DRBs) and identify which RLC segments have been sent and received based on the RLC status. Even though the BAP entities are different, the BAP entities may be uniquely identifiable in order for handovers to be smooth. For this, a new sequence numbering scheme may be implemented for the BAP. This can be both unacknowledged and acknowledged (which may add in an additional overhead). Since this is a new numbering scheme only between IAB Nodes, the number of bits for sequence numbering can be small. For example, 8 bits may be sufficient. However, for non-overlapping capabilities, 16 bits may be ideal. This numbering may increase between 2 nodes and may be counted per "Destination ID" (for example, counted based on an identifier (ID) corresponding to the destination of the communication). During handover, with this new numbering scheme at least the details of highest sequence number of BAP sent to/from the IAB Node to its parent may be provided. In case of acknowledgement, the highest sequence number of IAB Node acknowledged may be provided (this can be an optional field). For 1 to N mapping (where N is a number greater than 1), the approach may be similar to the 1:1 mapping approach. Implementation of the CDAPS, DAPS-like protocol at BAP approach may add additional fields to a BAP header for the new sequence numbering mechanism to handle handovers.

Figure 13:
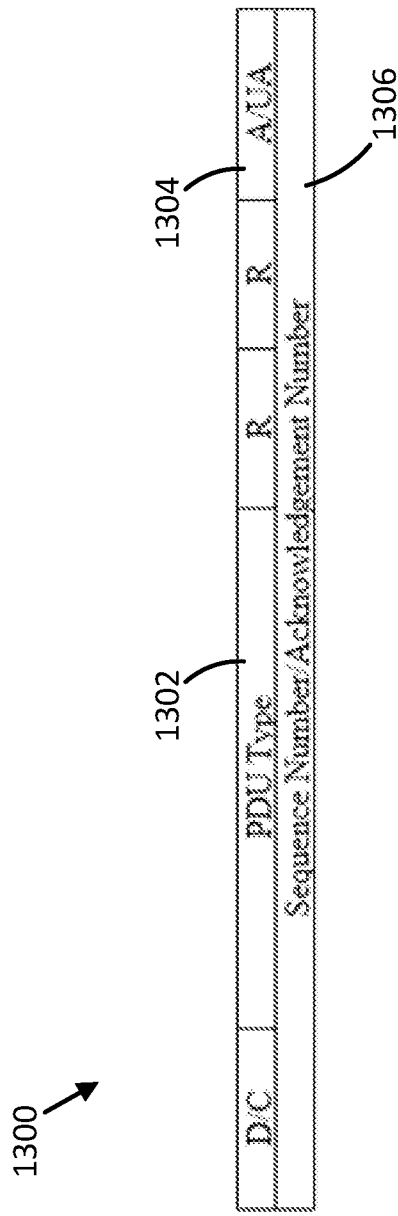
FIG. 13 illustrates an example header that may be implemented for the enhanced dual access protocol stack, dual access protocol stack-like protocol at backhaul adaptation protocol approach in accordance with some embodiments.

FIG. 13 illustrates an example header 1300 that may be implemented for the eDAPS, DAPS-like protocol at BAP approach in accordance with some embodiments. The header 1300 may be a BAP header. The header 1300 may be transmitted from an IAB node to an IAB parent node (or from the IAB parent node to the IAB node) during handover, where the IAB node is being handed over to the IAB parent node by the handover. The header 1300 may include a packet data unit (PDU) type field 1302. The header 1300 may further include a A/UA field 1304 that may indicate whether the header 1300 is in an acknowledgement operation mode or a not within an acknowledgement operation mode. The header 1300 may further include a sequence number/acknowledgement number field 1306 that may indicate an 8-bit sequence numbering or an acknowledgement numbering between BAP entities. In particular, the sequence number/acknowledgement number field 1306 may be an 8-bit sequence numbering of a last transmission that occurred between a source IAB parent node and the IAB node prior to initiation of the handover of the IAB node from the source IAB parent node to the target IAB parent node when the header 1300 is not being used within acknowledgement operation mode. The sequence number/acknowledgement number field 1306 may be an 8-bit sequence numbering of a last acknowledged transmission that occurred between the source IAB parent node and the IAB node prior to initiation of the handover of the IAB node from the source IAB parent node to the target IAB parent node.

Figure 14:
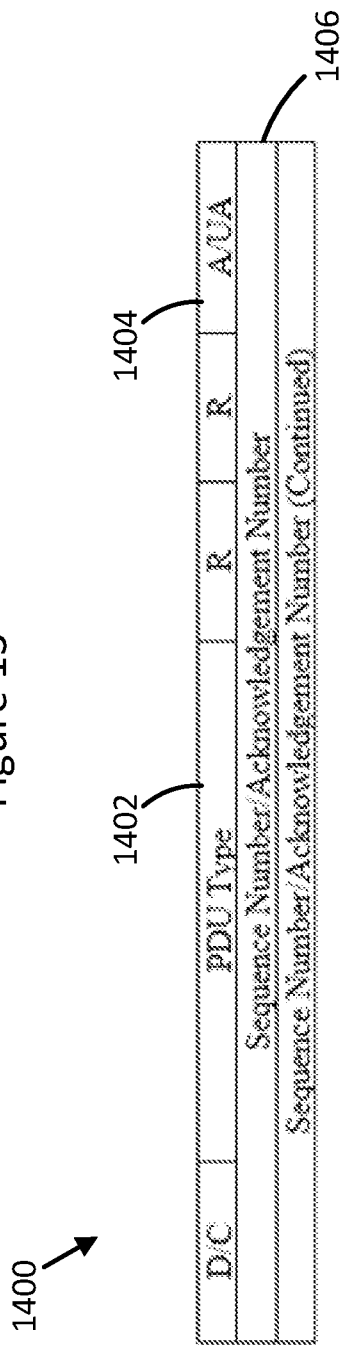
FIG. 14 illustrates an example header that may be implemented for the enhanced dual access protocol stack, dual access protocol stack-like protocol at backhaul adaptation protocol approach in accordance with some embodiments.

FIG. 14 illustrates an example header 1400 that may be implemented for the eDAPS, DAPS-like protocol at BAP approach in accordance with some embodiments. The header 1400 may be a BAP header. The header 1400 may be transmitted from an IAB node to an IAB parent node (or from the IAB parent node to the IAB node) during handover, where the IAB node is being handed over to the IAB parent node by the handover. The header 1400 may include a packet data unit (PDU) type field 1402 that indicates a PDU type of a transmission associated with the header 1400. The header 1400 may further include a A/UA field 1404 that may indicate whether the header 1400 is in an acknowledgement operation mode or a not within an acknowledgement operation mode. The header 1400 may further include a sequence number/acknowledgement number field 1406 that may indicate a 16-bit sequence numbering or an acknowledgement numbering between BAP entities (which is indicated by the sequence number/acknowledgment number field 1406 extending for two lines, each of the lines being 8 bits long). In particular, the sequence number/acknowledgement number field 1406 may be a 16-bit sequence numbering of a last transmission that occurred between a source IAB parent node and the IAB node prior to initiation of the handover of the IAB node from the source IAB parent node to the target IAB parent node when the header 1400 is not being used within acknowledgement operation mode. The sequence number/acknowledgement number field 1406 may be a 16-bit sequence numbering of a last acknowledged transmission that occurred between the source IAB parent node and the IAB node prior to initiation of the handover of the IAB node from the source IAB parent node to the target IAB parent node. The header 1300 (FIG. 13) and/or the header 1400 may be utilized with the DAPS-like at BAP approach described above to address the possible weaknesses of the DAPS-like at BAP approach and may improve the operation of the DAPS-like at BAP approach.

An eDAPS, DAPS-like protocol at RLC approach may be applied in some embodiments to address possible weaknesses of the DAPS-like at RLC approach described above. For a 1 to 1 mapping, BAP layer may map the individual sequence number for the traffic carried through these DRBs and identify which RLC segments have been sent and received based on the RLC status. Even though the BAP entities are different, the BAP entities may be uniquely identifiable in order for handovers to be smooth. A numbering mechanism may be implemented for handovers at each node per DRB to ensure the following details are at least transferred to the target IAB parent node. The details may include: 1) a highest sequence number received per the RLC ID within the BAP header (18-bits) (which may refer to FIG. 6.2.2.4-4 of 3GPP technical specification (TS) 38.322 (3GPP Organizational Partners. (1820-12). *3rd Generation Partnership Project; Technical Specification Group Radio Access Network; NR; Radio Link Control (RLC) protocol specification* (Release 16) (3GPP TS 38.322 V 16.2.0))). If segmentations are enabled then Segment Offset (16-bits); 2) a highest acknowledge (ACK) sent (18 bits) (which may refer to FIGS. 6.2.2.5-2 of TS 38.322; and 3) all negative acknowledged (NAKed) sequence numbers (which may refer to FIG. 6.2.2.5-2 Octets 4-18 of 3GPP TS 38.322). The 1 to N mapping (where N is a number greater than 1) may be simpler than the 1 to 1 mapping. For the 1 to N mapping, may reset RLC and use PDCP to get the data back—reliability and robustness may be an issue.

Figure 15:
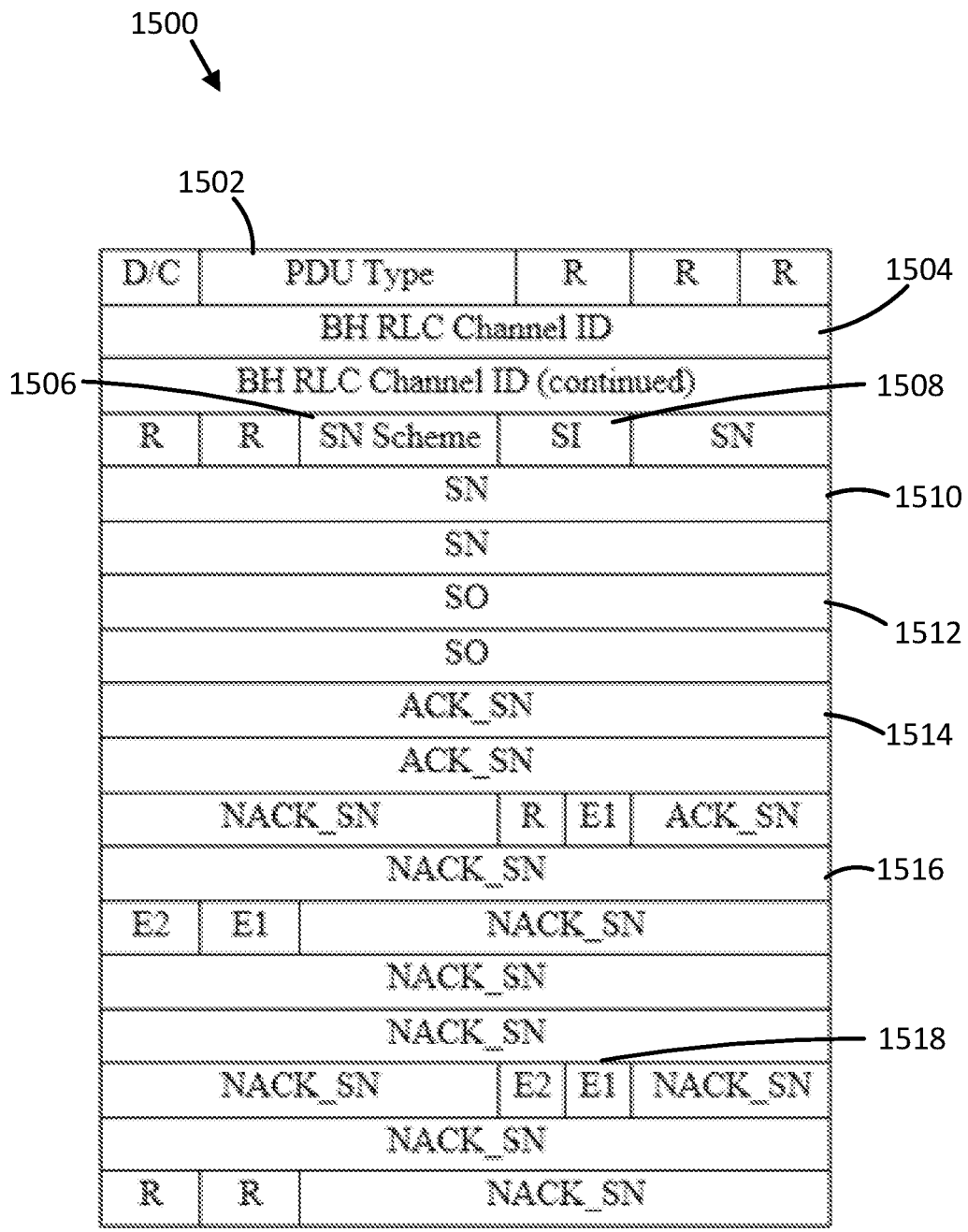
FIG. 15 illustrates an example header that may be implemented for the enhanced dual access protocol stack, dual access protocol stack-like protocol at radio link control approach in accordance with some embodiments.

FIG. 15 illustrates an example header 1500 that may be implemented for the eDAPS, DAPS-like protocol at RLC approach in accordance with some embodiments. The header 1500 may be a BAP header. The header 1500 may be transmitted from an IAB node to an IAB parent node (or from the IAB parent node to the IAB node) during handover, where the IAB node is being handed over to IAB parent node by the handover.

The header 1500 may include a PDU type field 1502 that may indicate a PDU type of a transmission associated with the header 1500. The header 1500 may further include a BH RLC channel ID field 1504 that may indicate a BH RUC channel ID for the transmission associated with the header 1500.

The header 1500 may further include a sequence number (SN) scheme field 1506. The SN scheme field 1506 may indicate how many bits are used for the sequence numbering. In some embodiments, the SN scheme field 1506 may indicate that the sequence numbering is 6-bits, 8-bit, or 18-hit sequence numbering.

The header 1500 may further include a SI field 1508. The SI field 1508 may indicate a segmentation that is present for the transmission.

The header 1500 may further include an SN field 1510. The SN field 1510 may indicate a sequence numbering of a last transmission that occurred between a source IAB parent node and the IAB node prior to initiation of the handover of the IAB node from the source IAB parent node to the target IAB parent node. In the illustrated embodiment, the sequence numbering may be an 18-bit sequence numbering, which causes the SN field 1510 to extend across two and a portion lines within the header 1500. A length of the SN field 1510 may be adjusted accordingly for 6-bit sequence numbering and 12-bit sequence numbering.

The header 1500 may further include an SO field 1512. The SO field 1512 may indicate segment offsets that have been sent. The segment offsets that have been set may be based on a value of the SI field 1508 being a 0 or a 1. If the value of the SI field 1508 is equal to 0, the segment offset bytes may be saved.

The header 1500 may further include an ACK_SN field 1514. The ACK_SN field 1514 may indicate sequence numbering of transmissions that were acknowledged that occurred between the source IAB parent node and the IAB node prior to initiation of the handover of the IAB node from the source IAB parent node to the target IAB parent node. In some embodiments, the indication of the sequence numbering of the transmissions may be an indication of a highest sequence numbering associated with a transmission acknowledged that occurred between the source IAB parent node and the IAB node prior to initiation of the handover of the IAB node from the source IAB parent node to the target IAB parent node. The ACK_SN field 1514 may be for an 18-bit sequence numbering, where an 18-bit sequence numbering may need 18-bit acknowledgements. If 6-bit sequence numbering or 12-bit sequence numbering is implemented, a length of the ACK_SN field 1514 may be adjusted accordingly based on the sequence numbering length.

The header 1500 may further include a NACK_SN field 1516. The NACK_SN field 1516 may indicate sequence numbering of transmissions that were negative acknowledged that occurred between the source IAB parent node and the IAB node prior to initiation of the handover of the IAB node from the source IAB parent node to the target IAB parent node. In some embodiments, the indication of the sequence numbering of the transmissions may be an indication of a highest sequence numbering associated with a transmission that was negative acknowledged that occurred between the source IAB parent node and the IAB node prior to initiation of the handover of the IAB node from the source IAB parent node to the target IAB parent node. The NACK_SN field 1516 may be for an 8-bit sequence numbering, where an 18-bit sequence numbering may need 18-bit negative acknowledgements. If 6-bit sequence numbering or 12-bit sequence numbering is implemented, a length of the NACK_SN field 1516 may be adjusted accordingly based on the sequence numbering length.

The header 1500 may further include one or more extension bits fields 1518. The extension bits fields 1518 may indicate if there are additional negative acknowledgements present. For example, the extension hits fields 1518 may indicate whether there were additional transmissions that were negative acknowledged that occurred between the source IAB parent node and the IAB node prior to initiation of the handover of the IAB node from the source IAB parent node to the target IAB parent node that were not indicated by the NACK_SN field 1516. The header 1500 may be utilized with the DAPS-like at RlX approach described above to address the possible weaknesses of the DAPS-like at RLC approach and may improve the operation of the DAPS-like at RLC approach.

Issue to be addressed for topology adaptations for connectivity robustness in IAB networks: find a mechanism through which efficient handling of IAB nodes and their descendants can be handled in a reliable and robust manner. Approaches for addressing may help speed up the procedure when using CHOs and NR-DC to aid in the network load handling capabilities. However, resource reservation in terms of additional channels so that IAB nodes can broadcast their connectivity request message.

A first enhanced CHO approach may be implemented. A new message that can be sent to all the potentially available IAB parent nodes may be introduced called Broadcast Re-establishment Message Request (BRM) or Broadcast Message (BSoS). Any parent node that receives the broadcast re-establishment message request can respond. The broadcast re-establishment message request may be transmitted between only IAB Nodes and not to the UEs. A secure key may be exchanged at the RRC setup phase of the IAB nodes and may be used for secure broadcasting in case of failures. For example, the broadcast re-establishment message request may be encrypted using and/or decrypted using the secure key. The secure, encrypted broadcast re-establishment message request, upon decryption, can be decoded into a typical RRC abstract syntax notation 1 (ASN 1) structure. Among other fields, the following fields may be included in order for the approach to be useful: 1) request number in current broadcast sequence—integer counter; 2) previous parent ID—To indicate what the parent node was before the failure event; 3) failure cause—RLF (what kind), others; 4) number of direct IAB Descendants (potentially IDs); 5) number of indirect IAB Descendants (potentially IDs); 6) number of active/inactive UEs; and/or 7) split descendants allowed Yes/No Boolean.

Figure 16:
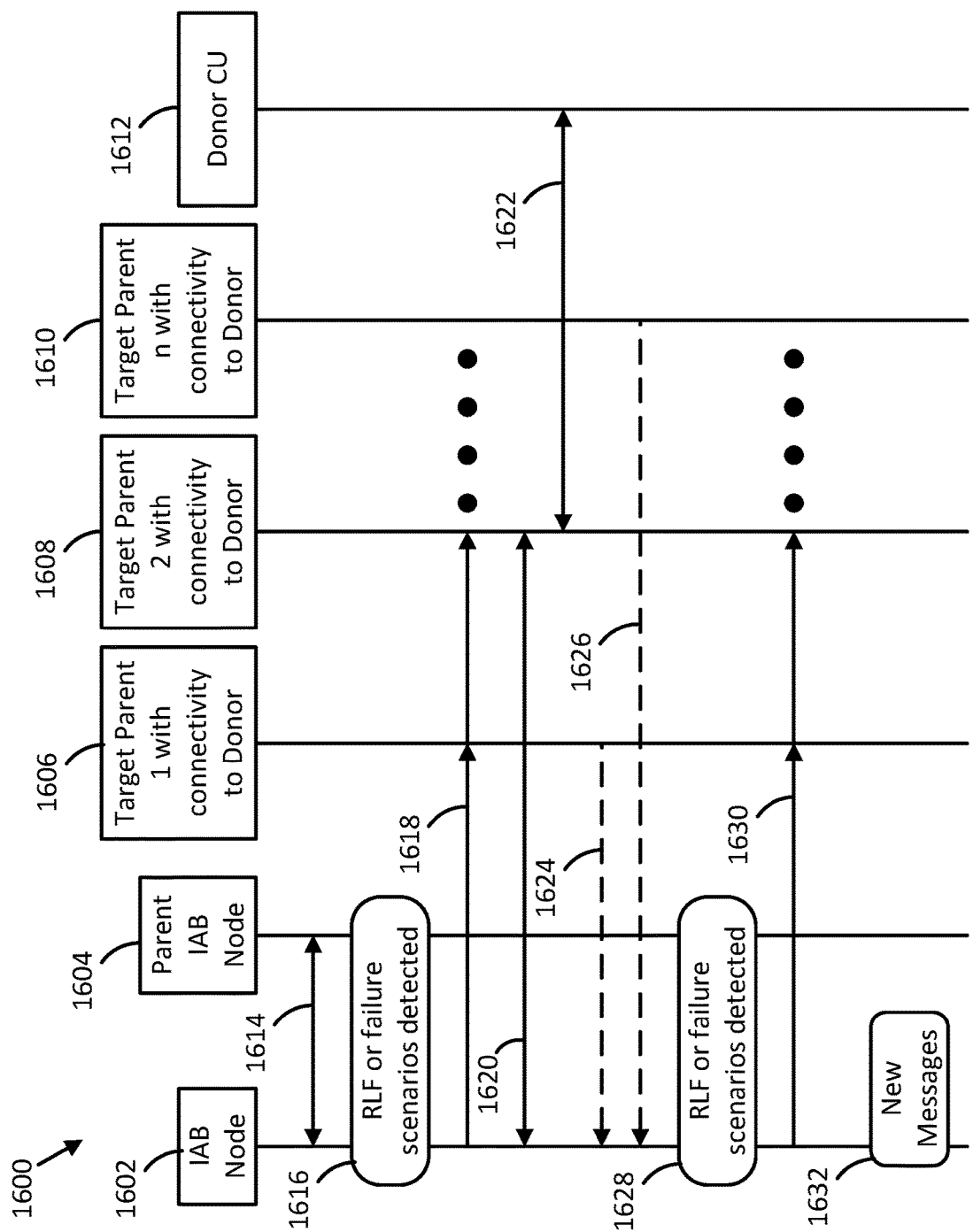
FIG. 16 illustrates an example call flow for the first enhanced conditional handover approach in accordance with some embodiments.

FIG. 16 illustrates an example call flow 1600 for the first enhanced CHO approach in accordance with some embodiments. The call flow 1600 illustrates example communications that may occur between an IAB node 1602, a parent IAB node 1604, a first target parent node 1606 with connectivity to a donor, a second target parent node 1608 with connectivity to the donor, an n-target parent node 1610 with connectivity to the donor, and a donor CU 1612 of the donor. The call flow 1600 may be performed to handover the IAB node 1602 from the parent IAB node 1604 to one of the target parent nodes. The IAB node 1602, the parent IAB node 1604, and the target parent nodes may each include one or more of the features of the IAB nodes described in relation to FIG. 2 and/or the IAB nodes described in relation to FIG. 3 and FIG. 4.

The call flow 1600 may include exchanging a security key in 1614. The security key may be exchanged between the IAB node 1602 and the parent IAB node 1604. The security key may be exchanged during IAB node setup with trust nodes.

The call flow 1600 may include detecting RLF or failure scenarios in 1616. For example, the IAB node 1602 may detect RIF or another failure scenario between the IAB node 1602 and the parent IAB node 1604.

The call flow 1600 may include transmitting a broadcast re-establishment message request in 1618. In particular, the IAB node 1602 may broadcast the broadcast re-establishment message request described above to the target parent nodes. For example, the IAB node 1602 may broadcast the broadcast re-establishment message request to the first target parent node 1606, the second target parent node 1608, and the n-target parent node 1610 in the illustrated embodiment.

The call flow 1600 may include performing an RRC re-establishment procedure in 1620. For example, the IAB node 1602 may have determined to establish an RRC connection with the second target parent node 1608 in the illustrated embodiment based on available capacity at the second target parent node 1608. In some embodiments, the IAB node 1602 may identify the first target parent node to have responded with enough available capacity to be target parent node with which the RRC connection is to be established. The RRC re-establishment procedure may be performed between the IAB node 1602 and the second target parent node 1608 to establish an RRC connection.

The call flow 1600 may include updating the CU with a new path in 1622. In particular, the second target parent node 1608 may communicate with the donor CU 1612 to update the donor CU 1612 on the new path to the IAB node 1602 after the RRC connection has been established with the second target parent node 1608. The second target parent node 1608 may indicate to the donor CU 1612 that the IAB node 1602 has established an RRC connection with the second target parent node 1608 and the second target parent node 1608 is serving the IAB node 1602.

The call flow 1600 may include the IAB node 1602 receiving responses to the broadcast re-establishment message request from other target parent nodes in 1624 and 1626. As the IAB node 1602 had already selected a target parent node for RRC re-establishment, the IAB node 1602 may ignore the responses from the other target parent nodes.

The call flow 1600 may include detecting RLF or failure scenarios in 1628. For example, the IAB node 1602 may detect REF or another failure scenario between the IAB node 1602 and the second target parent node 1608.

The call flow 1600 may include transmitting a second broadcast re-establishment message request in 1630. In particular, the IAB node 1602 may broadcast the second broadcast re-establishment message request described above to the target parent nodes. For example, the IAB node 1602 may broadcast the broadcast re-establishment message request to the first target parent node 1606, the second target parent node 1608, and the n-target parent node 1610 in the illustrated embodiment.

The call flow 1600 may continue with new messages in 1632. For example, the call flow 1600 may continue with additional re-establishment procedures and/or updating of the donor CU 1612 based on the second broadcast re-establishment message request from 1630. Broadcasting the broadcast re-establishment message request, as shown in the call flow 1600, may be utilized with the NR-DC approach and/or the CHO approach described above to address the possible weaknesses of the NR-DC approach and/or the CHO approach and may improve the operation of the NR-DC approach and/or the Cl-JO approach.

A second enhanced CHO approach may be implemented. For example, a multicast CHO SOS request may be implemented. The first enhanced CHO approach may be a broadcast approach where the source IAB Node experiencing loss of connectivity sends a broadcast SOS message requesting any available node for connectivity. The first enhanced CHO approach, however, might not always be the ideal solution since, depending on the available power at the IAB Node, the SOS message might be received at nodes farther away from the actual node leading to unnecessary responses from a number of available nodes. For the second enhanced CHO approach, an alternate mechanism may take advantage of the CHO mechanism available where the pre-configured list of potential parent nodes is already available at CU. The second enhanced CHO approach may ensure that a failed CHO does not have to be retried in sequence to all the potential parent nodes. In the second enhanced CHO approach, instead of broadcast, the SOS message may be multicasted only to the nodes that are preconfigured in the CHO. An additional advantage of this approach is what CHO by itself provides in third generation partnership project release-16 (Rel-16). In case the first SOS request fails, the IAB Node removes the CHO configuration for that potential IAB parent from its configuration and can only retry to the remaining nodes.

Figure 17:
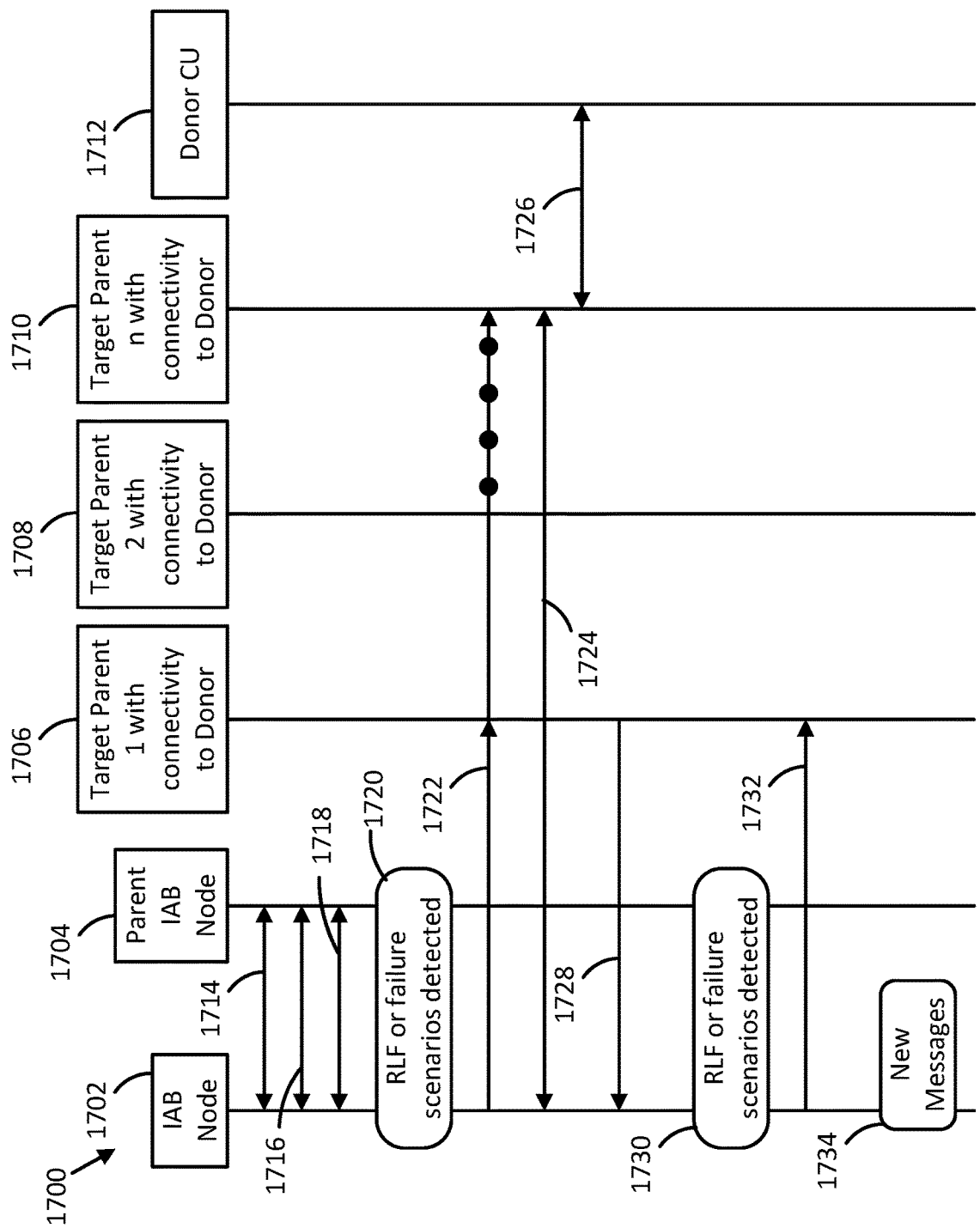
FIG. 17 illustrates an example call flow for the second enhanced conditional handover approach in accordance with some embodiments.

FIG. 17 illustrates an example call flow 1700 for the second enhanced CHO approach in accordance with some embodiments. The call flow 1700 illustrates example communications that may occur between an IAB node 1702, a parent IAB node 1704, a first target parent node 1706 with connectivity to a donor, a second target parent node 1708 with connectivity to the donor, an n-target parent node 1710 with connectivity to the donor, and a donor CU 1712 of the donor. The call flow 1700 may be performed to handover the IAB node 1702 from the parent IAB node 1704 to one of the target parent nodes. The IAB node 1702, the parent IAB node 1704, and the target parent nodes may each include one or more of the features of the IAB nodes described in relation to FIG. 2 and/or the IAB nodes described in relation to FIG. 3 and FIG. 4.

The call flow 1700 may include performing RRC reconfiguration with CHO criteria in 1714. For example, the IAB node 1702 and the parent IAB node 1704 may exchange communications to establish an RRC connection between the IAB node 1702 and the parent IAB node 1704 with the CHO criteria.

The call flow 1700 may include exchanging source gNB handover command and ACK in 1716. For example, the IAB node 1702 and the parent IAB node 1704 may exchange communications for a source gNB handover command and ACK.

The call flow 1700 may include exchanging a security key in 1718. The security key may be exchanged between the IAB node 1702 and the parent IAB node 1704. The security key may be exchanged during IAB node setup with trust nodes.

The call flow 1700 may include detecting RLF or failure scenarios in 1720. For example, the IAB node 1702 may detect RLF or another failure scenario between the IAB node 1702 and the parent IAB node 1704.

The call flow 1700 may include transmitting a broadcast re-establishment message request in 1722. In particular, the IAB node 1702 may identify possible target parent nodes to which to transmit the broadcast re-establishment message. The possible target parent nodes may be included in a pre-configured list of potential parent nodes, where the list may be pre-configured prior to the RLF or failure scenarios detection of 1720. The potential parent nodes included in the list may be equal or closer (for example, include a same number of hops or less hops) to the donor CU 1712 than the parent IAB node 1704. The IAB node 1702 may multicast the broadcast re-establishment message request described above to the identified possible target parent nodes and may not transmit the broadcast re-establishment message to other target parent nodes not identified. For example, the IAB node 1702 may multicast the broadcast re-establishment message request to the first target parent node 1706 and the n-target parent node 1710 and may not transmit the broadcast re-establishment message request to the second target parent node 1708, in the illustrated embodiment.

The call flow 1700 may include performing an RRC re-establishment procedure in 1724. For example, the IAB node 1702 may have determined to establish an RRC connection with the n-target parent node 1710 in the illustrated embodiment based on available capacity at the n-target parent node 1710. In some embodiments, the IAB node 1702 may identify the first target parent node to have responded with enough available capacity to be target parent node with which the RRC connection is to be established. The RRC re-establishment procedure may be performed between the IAB node 1702 and the n-target parent node 1710 to establish an RRC connection.

The call flow 1700 may include updating the CU with a new path in 1726. In particular, the n-target parent node 1710 may communicate with the donor CU 1712 to update the donor CU 1712 on the new path to the IAB node 1702 after the RRC connection has been established with the n-target parent node 1710. The n-target parent node 1710 may indicate to the donor CU 1712 that the IAB node 1702 has established an RRC connection with the n-target parent node 1710 and the n-target parent node 1710 is serving the IAB node 1702.

The call flow 1700 may include the IAB node 1702 receiving responses to the broadcast re-establishment message request from other target parent nodes in 1728. As the IAB node 1702 had already selected a target parent node for RRC re-establishment, the IAB node 1702 may ignore the responses from the other target parent nodes.

The call flow 1700 may include detecting RLF or failure scenarios in 1730. For example, the IAB node 1702 may detect RLF or another failure scenario between the IAB node 1702 and the n-target parent node 1710.

The call flow 1700 may include transmitting a second broadcast re-establishment message request in 1732. In particular, the IAB node 1702 may multicast the second broadcast re-establishment message request described above to the identified target parent nodes remaining in the pre-configured list of potential parent nodes. As the n-target parent node 1710 is the node with which the RLF or failure scenarios were detected, the n-target parent node 1710 may have been removed from the pre-configured list of potential parent nodes and the second broadcast re-establishment message request may not be transmitted to the n-target parent node 1710. Fax example, the IAB node 1702 may multicast the second broadcast re-establishment message request to the first target parent node 1706 in the illustrated embodiment.

The call flow 1700 may continue with new messages in 1734. For example, the call flow 1700 may continue with additional re-establishment procedures and/or updating of the donor CU 1712 based on the second broadcast re-establishment message request from 1732. Multicasting the broadcast re-establishment message request, as shown in the call flow 1700, may be utilized with the NR-DC approach and/or the CHO approach described above to address the possible weaknesses of the NR-DC approach and/or the CHO approach and may improve the operation of the NR-DC approach and/or the CHO approach.

A third enhanced CHO approach may be implemented. One issue that may be presented with the first enhanced CHO approach and the second enhanced CHO approach presented above is that multiple nodes either configured (CHO based) or non-configured (RRC re-establishment based) might not be available to handle the incoming capacity load of the failing IAB node. Another way may be a scheme which can distribute the load across multiple parent IAB nodes thus prioritizing connectivity. The network can always be re-configured to the optimal settings of latency and other performance once connectivity is restored.

Multiple mechanisms can be implemented in order to share the nodes across the available parent nodes. In a first option of the third enhanced CHO approach, a responding parent node may list out the potential capacity it can take in the RRC reconfiguration message or handover complete message based on its available capacity or any other criteria. For example, a target parent node may include the RRC reconfiguration message or the handover complete message as part of the RRC re-establishment procedure in 1620 (FIG. 16) or the RRC re-establishment procedure in 1724 (FIG. 17). The IAB node seeking re-establishment based on the received responses can decide on which nodes can go to which parent node including itself.

In a second option of the third enhanced CHO approach, a responding parent may list out the potential capacity it can take in the RRC reconfiguration message or handover complete message based on its available capacity or any other criteria. For example, a target parent node may include the RRC reconfiguration message or the handover complete message as part of the RRC re-establishment procedure in 1620 (FIG. 16) or the RRC re-establishment procedure in 1724 (FIG. 17). The node seeking re-establishment based on the received responses may randomize the number of nodes to ensure that those nodes which have higher available capacity are prioritized.

In a third option of the third enhanced CHO approach, the multicast messages may be sent with the required capacity per parent IAB Node. For example, a new information element (IE) may be added to the multicast indicating how much capacity is being requested from the parent node based on the load and topology information from the Donor CU. The new IE may be sent in the multicasted broadcast re-reestablishment message request in 1722 (FIG. 17) and/or the multicasted second broadcast re-establishment message request in 1732 (FIG. 17). The IE may have the following fields: 1) parent IAB Node ID "x": Capacity Request: 5 IAB Descendent Nodes (with their IDs), 50 Active UEs, 100 Idle UEs; and/or 2) parent IAB Node ID "y": Capacity Request: 2 IAB Descendent Nodes (with their IDs), 20 Active UEs, 20 idle UEs.

In a fourth option of the third CHO approach, instead of prioritizing the nodes based on only capacity, the IAB Node seeking connectivity can prioritize nodes which have the highest mean time between failures (MTBF) (the failures here aggregated across RLFs and RRC Failures). For this option, the nodes that are highly connected and have the lowest chance of failing may be preferred. However, to ensure sufficient load balancing, only quality of service (QoS) flows may be transferred to these nodes while the best effort flows could be transferred to alternate parents ensuring that performance is not sacrificed.

Figure 18:
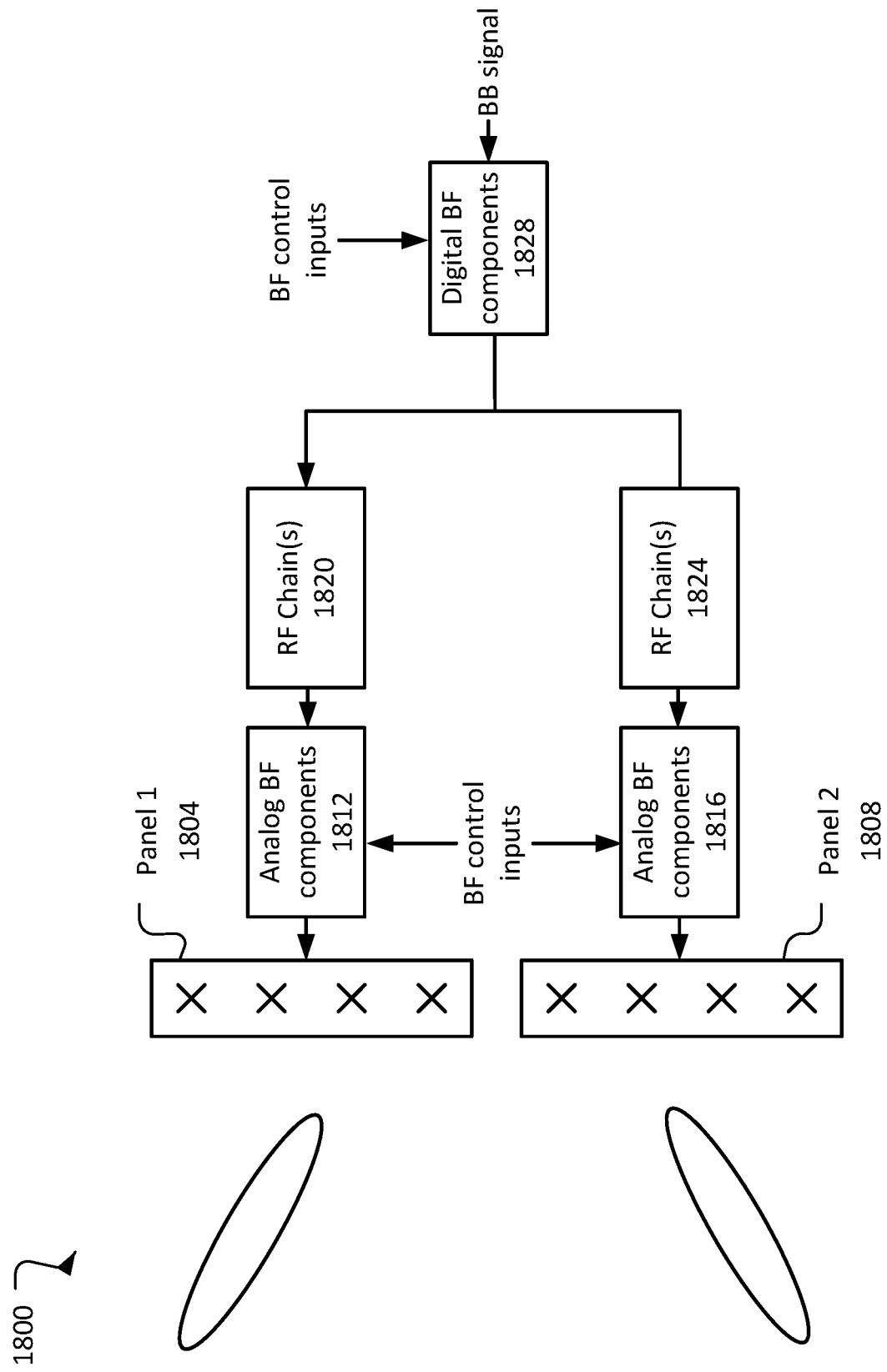
FIG. 18 illustrates example beamforming circuitry in accordance with some embodiments.

FIG. 18 illustrates example beamforming circuitry 1800 in accordance with some embodiments. The beamforming circuitry 1800 may include a first antenna panel, panel 1 1804, and a second antenna panel, panel 2 1808. Each antenna panel may include a number of antenna elements. Other embodiments may include other numbers of antenna panels.

Figure 19:
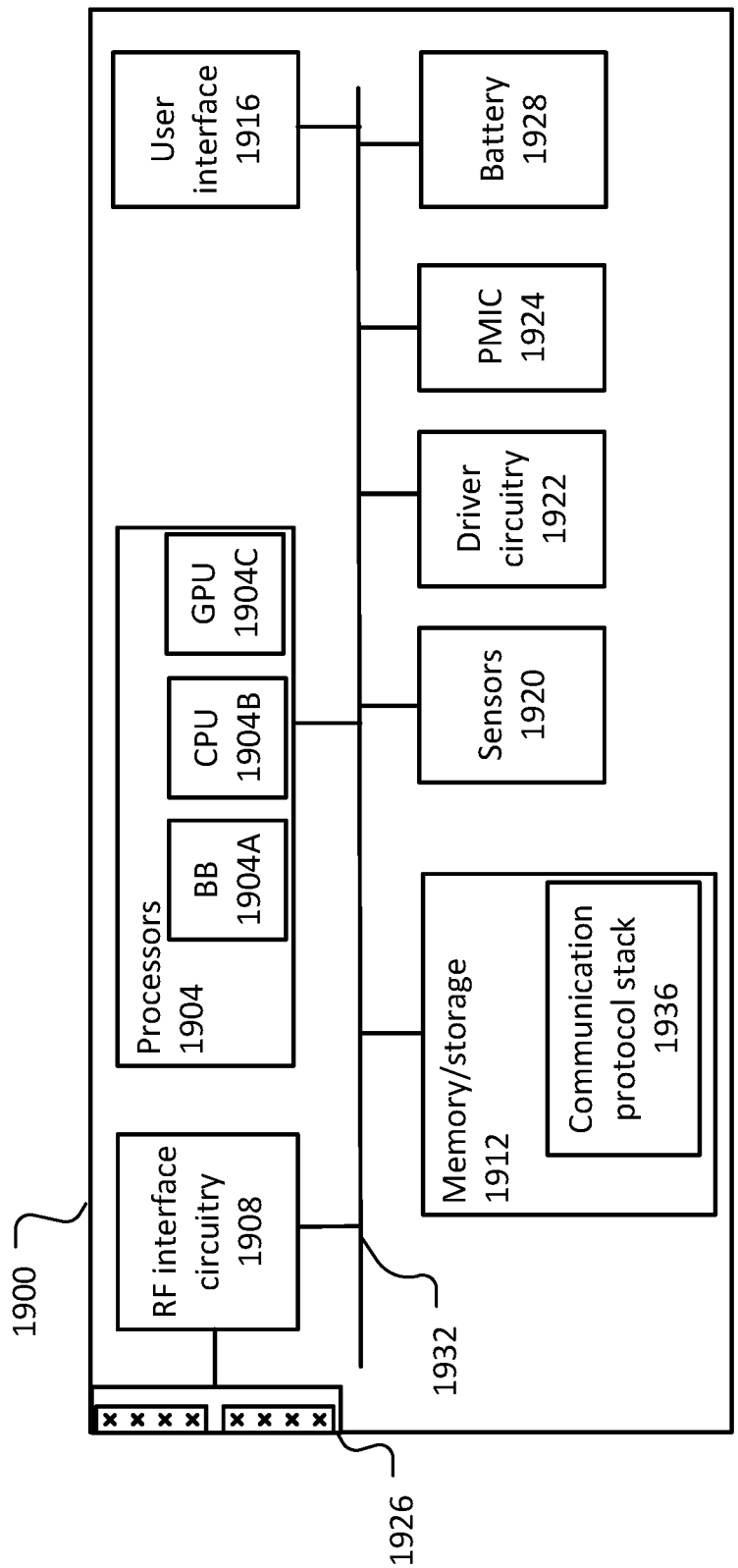
FIG. 19 illustrates an example user equipment in accordance with some embodiments.

Digital beamforming (BF) components 1828 may receive an input baseband (BB) signal from, for example, a baseband processor such as, for example, baseband processor 1904A of FIG. 19. The digital BF components 1828 may rely on complex weights to pre-code the BB signal and provide a beamformed BB signal to parallel radio frequency (RF) chains 1820/1824.

Each RF chain 1820/1824 may include a digital-to-analog converter to convert the BB signal into the analog domain; a mixer to mix the baseband signal to an RF signal; and a power amplifier to amplify the RF signal for transmission.

The RF signal may be provided to analog BF components 1812/1816, which may apply additionally beamforming by providing phase shifts in the analog domain. The RF signals may then be provided to antenna panels 1804/1808 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 19 illustrates an example UE 1900 in accordance with some embodiments. The UEs described throughout this disclosure may include one or more of the features of the UE 1900. The UE 1900 may be any mobile or non-mobile computing device; such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1900 may be a RedCap UE or NR-Light UE.

The UE 1900 may include processors 1904, RF interface circuitry 1908, memory/storage 1912, user interface 1916, sensors 1920, driver circuitry 1922, power management integrated circuit (PMIC) 1924, antenna structure 1926, and battery 1928. The components of the UE 1900 may be implemented as integrated circuits (ICs), portions thereof, discrete electronic devices, or other modules, logic, hardware, software, firmware, or a combination thereof. The block diagram of FIG. 19 is intended to show a high-level view of some of the components of the UE 1900. However, some of the components shown may be omitted, additional components may be present, and different arrangement of the components shown may occur in other implementations.

The components of the UE 1900 may be coupled with various other components over one or more interconnects 1932, which may represent any type of interface, input/output, bus (local, system, or expansion), transmission line, trace, optical connection, etc. that allows various circuit components (on common or different chips or chipsets) to interact with one another.

The processors 1904 may include processor circuitry such as, for example, baseband processor circuitry (BB) 1904A, central processor unit circuitry (CPU) 1904B, and graphics processor unit circuitry (GPU) 1904C. The processors 1904 may include any type of interface circuitry or processor circuitry that executes or otherwise operates computer-executable instructions, such as program code, software modules, or functional processes from memory storage 1912 to cause the UE, 1900 to perform operations as described herein.

In some embodiments, the baseband processor circuitry 1904A may access a communication protocol stack 1936 in the memory/storage 1912 to communicate over a 3GPP compatible network. In general, the baseband processor circuitry 1904A may access the communication protocol stack to perform user plane functions at a PHY layer, MAC layer. RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1908.

The baseband processor circuitry 1904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1912 may include one or more non-transitory, computer-readable media that includes instructions (for example, communication protocol stack 1936) that may be executed by one or more of the processors 1904 to cause the UE 1900 to perform various operations described herein. The memory/storage 1912 include any type of volatile or non-volatile memory that may be distributed throughout the UE 1900. In some embodiments, some of the memory/storage 1912 may be located on the processors 1904 themselves (for example, L1 and L2 cache), while other memory/storage 1912 is external to the processors 1904 but accessible thereto via a memory interface. The memory/storage 1912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1908 may include transceiver circuitry and radio frequency front module (RFEM) that allows the UE 1900 to communicate with other devices over a radio access network. The RF interface circuitry 1908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1926 and proceed to filter and amplify (with a low-noise amplifier) the signal. The signal may be provided to a receiver of the transceiver that down-converts the RF signal into a baseband signal that is provided to the baseband processor of the processors 1904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1926.

In various embodiments, the RF interface circuitry 1908 may be configured to transmit/receive signals in a manner compatible with NR access technologies.

The antenna 1926 may include antenna elements to convert electrical signals into radio waves to travel through the air and to convert received radio waves into electrical signals. The antenna elements may be arranged into one or more antenna panels. The antenna. 1926 may have antenna panels that are omnidirectional, directional, or a combination thereof to enable beamforming and multiple input, multiple output communications. The antenna 1926 may include microstrip antennas, printed antennas fabricated on the surface of one or more printed circuit boards, patch antennas, phased array antennas, etc. The antenna 1926 may have one or more panels designed for specific frequency bands including bands in FR1 or FR2.

In some embodiments, the UE 1900 may include the beamforming circuitry 1800 (FIG. 18), where the beamforming circuitry 1800 may be utilized for communication with the LIE 1900. In some embodiments, components of the UE 1900 and the beamforming circuitry may be shared. For example, the antennas 1926 of the UE may include the panel 1 1804 and the panel 2 1808 of the beamforming circuitry 1800.

The user interface circuitry 1916 includes various input/output (I/O) devices designed to enable user interaction with the UE 1900. The user interface 1916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1900.

The sensors 1920 may include devices, modules, or subsystems whose purpose is to detect events or changes in its environment and send the information (sensor data) about the detected events to some other device, module, subsystem, etc. Examples of such sensors include, inter cilia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1922 may include software and hardware elements that operate to control particular devices that are embedded in the UE 1900, attached to the UE 1900, or otherwise communicatively coupled with the UE 1900. The driver circuitry 1922 may include individual drivers allowing other components to interact with or control various input/output (I/O) devices that may be present within, or connected to, the UE 1900. For example, driver circuitry 1922 may include a display driver to control and allow access to a display device, a touchscreen driver to control and allow access to a touchscreen interface, sensor drivers to obtain sensor readings of sensor circuitry 1920 and control and allow access to sensor circuitry 1920, drivers to obtain actuator positions of electro-mechanic components or control and allow access to the electro-mechanic components, a camera driver to control and allow access to an embedded image capture device, audio drivers to control and allow access to one or more audio devices.

The PMIC 1924 may manage power provided to various components of the UE 1900. In particular, with respect to the processors 1904, the PMIC 1924 may control power-source selection, voltage scaling, battery charging, or DC-to-DC conversion.

In some embodiments, the PMIC 1924 may control, or otherwise be part of, various power saving mechanisms of the UE 1900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1900 may power down for brief intervals of time and thus save power. If there is no data traffic activity for an extended period of time, then the UE 1900 may transition off to an RRC Idle state, where it disconnects from the network and does not perform operations such as channel quality feedback, handover, etc. The UE, 1900 goes into a very low power state and it performs paging where again it periodically wakes up to listen to the network and then powers down again. The UE 1900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1928 may power the UE 1900, although in some examples the UE 1900 may be mounted deployed in a fixed location and may have a power supply coupled to an electrical grid. The battery 1928 may be a lithium ion battery, a metal-air battery, such as a zinc-air battery, an aluminum-air battery, a lithium-air battery, and the like. In some implementations, such as in vehicle-based applications, the battery 1928 may be a typical lead-acid automotive battery.

Figure 20:
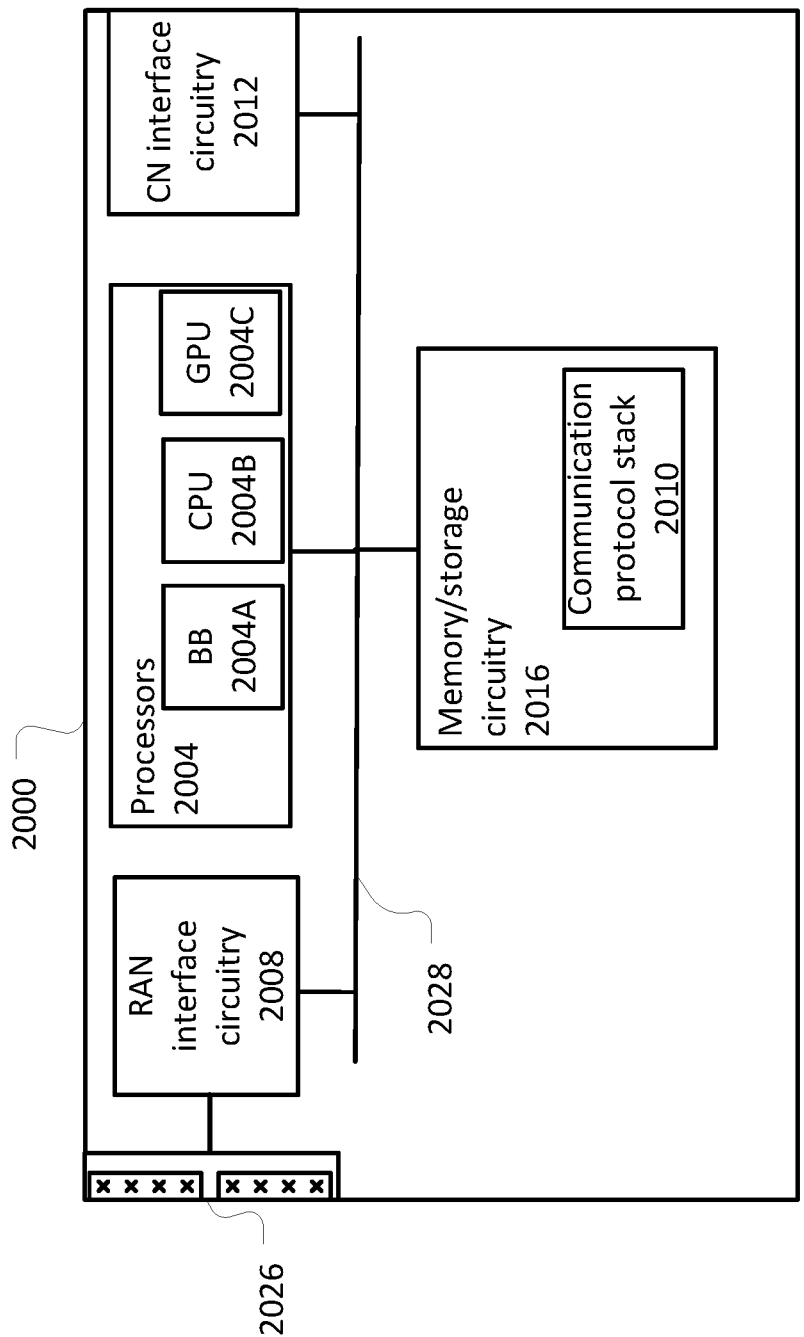
FIG. 20 illustrates an example next generation nodeB in accordance with some embodiments.

FIG. 20 illustrates an example gNB 2000 in accordance with some embodiments. The nodes (such as the IAB nodes, the IAB parent nodes, and the IAB child nodes) described throughout this disclosure may include one or more of the features of the gNB 2000. The gNB 2000 may include processors 2004, RF interface circuitry 2008, core network (CN) interface circuitry 2012, memory/storage circuitry 2016, and antenna structure 2026.

The components of the gNB 2000 may be coupled with various other components over one or more interconnects 2028.

The processors 2004, RF interface circuitry 2008, memory/storage circuitry 2016 (including communication protocol stack 2010), antenna structure 2026, and interconnects 2028 may be similar to like-named elements shown and described with respect to FIG. 19.

The CN interface circuitry 2012 may provide connectivity to a core network, for example, a 5th Generation Core network (SGC) using a SGC-compatible network interface protocol such as carrier Ethernet protocols, or some other suitable protocol. Network connectivity may be provided to/from the gNB 2000 via, a fiber optic or wireless relay. The CN interface circuitry 2012 may include one or more dedicated processors or FPGAs to communicate using one or more of the aforementioned protocols. In some implementations, the CN interface circuitry 2012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseball circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Claim 1 may include a method comprising monitoring transmissions between the node and a first parent integrated access and backhaul (IAB) node, maintaining sequence numbers from backhaul adaptation protocol (BAP) headers of the transmissions between the node and a first parent integrated access and backhaul (IAB) node, and providing, during a handover procedure of the node from the first parent IAB node to a second parent IAB node, an indication of the maintained sequence numbers to the second parent IAB node.

Claim 2 may include the method of example 1, further comprising detecting connection failure with the first parent IAB node and initiating the handover procedure of the node from the first parent IAB node to the second parent IAB node in response to the detection of the connection failure with the first parent IAB node.

Claim 3 may include the method of example 1, wherein the indication of the maintained sequence numbers indicates the highest sequence number of the maintained sequence numbers.

Claim 4 may include the method of example 1, wherein maintaining the sequence numbers includes maintaining a first group of sequence numbers corresponding to a first portion of the transmissions that have been acknowledged and a second group of sequence numbers corresponding to a second portion of the transmissions that have been negative acknowledged.

Claim 5 may include the method of example 4, wherein the indication of the maintained sequence numbers indicates a highest sequence within the first group of sequence numbers.

Claim 6 may include the method of example 4, wherein the indication of the maintained sequence numbers indicates sequence numbers within the second group of sequence numbers.

Claim 7 may include the method of example 1, wherein the sequence numbers are mapped to the transmissions by a BAP layer.

Claim 8 may include the method of example 1, wherein the transmissions are segmented, and wherein the method further comprises providing an indication of a segment offset for the transmissions.

Claim 9 may include a node comprising memory to store information associated with transmissions between the node and a first parent integrated access and backhaul (IAB) node, and processing circuitry coupled with the memory, the processing circuitry to cause a highest sequence number of the transmissions to be stored in the memory, the highest sequence number included in a backhaul adaptation protocol (BAP) header of a one of the transmissions, initiate a handover procedure to transfer the node from the first parent IAB node to a second parent IAB node, and provide an indication of the highest sequence number to the second parent IAB node as part of the handover procedure.

Claim 10 may include the node of example 9, wherein the processing circuitry is further to cause a first group of sequence numbers corresponding to a first portion of the transmissions that have been acknowledged to be stored in the memory, and cause a second group of sequence numbers corresponding to a second portion of the transmissions that have been negative acknowledged to be stored in the memory.

Claim 11 may include the node of example 10, wherein the processing circuitry is further to provide an indication of the highest acknowledged sequence number to the second parent IAB node as part of the handover procedure, the highest acknowledged sequence number being from the first group of sequence numbers.

Claim 12 may include the node of example 9, wherein sequence numbering for the transmissions is mapped to the transmissions by a BAP layer.

Claim 13 may include the node of example 12, wherein the sequence numbering for the transmissions is counted on a per destination identifier basis, where each destination identifier corresponds to a parent IAB node of the node.

Claim 14 may include the node of example 12, wherein each sequence number of the sequence numbering includes at least eight bits.

Claim 15 may include the node of example 9, wherein the node is connected to the first parent IAB node as a master node and the node is connected to the second parent IAB node as a secondary node, and wherein the handover procedure is to cause the second parent IAB node to become the master node.

Claim 16 max include the node of example 9, wherein sequence numbers of the transmissions comprise radio link control (RLC) sequence numbers within a RAP layer.

Claim 17 may include a method of operating a node, comprising storing sequence numbers for transmissions between the node and a first parent integrated access and backhaul (IAB) node, the sequence numbers obtained from backhaul adaptation protocol (BAP) headers of the transmissions, initiating a handover procedure of the node from the first parent IAB node to a second parent IAB node, identifying a highest sequence number from the stored sequence numbers based on the handover procedure being initiated, and providing, to the second parent IAB node, an indication of the highest sequence number.

Claim 18 may include the method of example 17, wherein storing the sequence numbers includes storing a portion of the sequence numbers as acknowledged sequence numbers based on transmissions associated with the portion of the sequence numbers being acknowledged, and wherein the method further comprises providing, to the second parent IAB node, an indication of a highest acknowledged sequence number from the acknowledged sequence numbers.

Claim 19 may include the method of example 17, wherein storing the sequence numbers includes storing a portion of the sequence numbers as negative acknowledged sequence numbers based on transmissions associated with the portion of the sequence numbers being negative acknowledged, and wherein the method further comprises providing, to the second parent IAB node, an indication of the negative acknowledged sequence numbers.

Claim 20 may include the method of example 17, wherein the sequence numbers are created and assigned by a BAP layer.

Claim 21 may include a method of operating a node, comprising detecting connection failure between the node and a first parent integrated access and backhaul (IAB) node, transmitting, to one or more other parent IAB nodes, a re-establishment message request that requests available IAB nodes to respond to indicate possible connectivity, selecting a second parent IAB node from the one or more other parent IAB nodes, and initiating a handover procedure to handover the node from the first parent IAB node to the second parent IAB node.

Claim 22 may include the method of example 21, wherein transmitting the re-establishment message request includes broadcasting the re-establishment message request within a geographic area, wherein the one or more other parent IAB nodes are located within the geographic area.

Claim 23 may include the method of example 21, wherein the one or more other parent IAB nodes are included in a pre-configured list of potential parent IAB nodes, and wherein transmitting the re-establishment message request includes multicasting the re-establishment message request to IAB nodes within the pre-configured list of potential parent IAB nodes.

Claim 24 may include the method of example 21, wherein the re-establishment message request includes a request number corresponding to the re-establishment message request, an identifier of the first parent IAB node, an indication of a failure cause, a number of direct IAB descendants connected to the node, a number of indirect IAB descendants connected to the node, a number of user equipments (UEs) connected to the node, or an indication of whether descendants connected to the node can be split between parent IABs.

Claim 25 may include the method of example 21, wherein selecting the second parent IAB node includes selecting the second parent IAB node based on the second parent IAB node having a highest mean time between failures of the one or more other parent IAB nodes.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, E, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
monitor transmissions between a node and a first parent integrated access and backhaul (IAB) node, the first parent IAB node being different from the node and the node being different from a user equipment;
maintain sequence numbers from backhaul adaptation protocol (BAP) headers of the transmissions between the node and the first parent IAB node; and
provide, during a handover procedure of the node from the first parent IAB node to a second parent IAB node, an indication of the maintained sequence numbers to the second parent IAB node, the second parent IAB node being different from the node.

2. The one or more non-transitory computer-readable media of claim 1, wherein the instructions, when executed, further cause the processing circuitry to:
detect connection failure with the first parent IAB node; and
initiate the handover procedure of the node from the first parent IAB node to the second parent IAB node in response to the detection of the connection failure with the first parent IAB node.

3. The one or more non-transitory computer-readable media of claim 1, wherein the indication of the maintained sequence numbers indicates a highest sequence number of the maintained sequence numbers.

4. The one or more non-transitory computer-readable media of claim 1, wherein to maintain the sequence numbers includes to maintain a first group of sequence numbers corresponding to a first portion of the transmissions that have been acknowledged and a second group of sequence numbers corresponding to a second portion of the transmissions that have been negatively acknowledged.

5. The one or more non-transitory computer-readable media of claim 4, wherein the indication of the maintained sequence numbers indicates a highest sequence within the first group of sequence numbers.

6. The one or more non-transitory computer-readable media of claim 4, wherein the indication of the maintained sequence numbers indicates sequence numbers within the second group of sequence numbers.

7. The one or more non-transitory computer-readable media of claim 1, wherein the sequence numbers are mapped to the transmissions by a BAP layer.

8. The one or more non-transitory computer-readable media of claim 1, wherein the transmissions are segmented, and wherein the instructions, when executed, further cause the processing circuitry to provide an indication of a segment offset for the transmissions.

9. An apparatus comprising:
processing circuitry to:
cause a highest sequence number of transmissions between a node and a first parent integrated access and backhaul (IAB) node to be stored in a memory, the highest sequence number included in a backhaul adaptation protocol (BAP) header of a one of the transmissions, the first parent IAB node being different from the node and the node being different from a user equipment;
initiate a handover procedure to transfer the node from the first parent IAB node to a second parent IAB node, the second parent IAB node being different from the node; and
provide an indication of the highest sequence number to the second parent IAB node as part of the handover procedure; and
interface circuitry coupled with the processing circuitry, the interface circuitry to communicatively couple the processing circuitry with a component of a device.

10. The apparatus of claim 9, wherein the processing circuitry is further to:
cause a first group of sequence numbers corresponding to a first portion of the transmissions that have been acknowledged to be stored in a memory; and
cause a second group of sequence numbers corresponding to a second portion of the transmissions that have negatively acknowledged to be stored in the memory.

11. The apparatus of claim 10, wherein the processing circuitry is further to:
provide an indication of the highest acknowledged sequence number to the second parent IAB node as part of the handover procedure, the highest acknowledged sequence number being from the first group of sequence numbers.

12. The apparatus of claim 9, wherein sequence numbering for the transmissions is mapped to the transmissions by a BAP layer.

13. The apparatus of claim 12, wherein the sequence numbering for the transmissions is counted on a per destination identifier basis, where each destination identifier corresponds to a parent IAB node of the node.

14. The apparatus of claim 12, wherein each sequence number of the sequence numbering includes at least eight bits.

15. The apparatus of claim 9, wherein the node is connected to the first parent IAB node as a master node and the node is connected to the second parent IAB node as a secondary node, and wherein the handover procedure is to cause the second parent IAB node to become the master node.

16. The apparatus of claim 9, wherein sequence numbers of the transmissions comprise radio link control (RLC) sequence numbers within a BAP layer.

17. A method, comprising:
storing sequence numbers for transmissions between a node and a first parent integrated access and backhaul (IAB) node, the sequence numbers obtained from backhaul adaptation protocol (BAP) headers of the transmissions, the first parent IAB node being different from the node and the node being different from a user equipment;
initiating a handover procedure of the node from the first parent IAB node to a second parent IAB node, the second parent IAB node being different from the node;
identifying a highest sequence number from the stored sequence numbers based on the handover procedure being initiated; and
providing, to the second parent IAB node, an indication of the highest sequence number.

18. The method of claim 17, wherein storing the sequence numbers includes storing a portion of the sequence numbers as acknowledged sequence numbers based on transmissions associated with the portion of the sequence numbers being acknowledged, and wherein the method further comprises providing, to the second parent IAB node, an indication of a highest acknowledged sequence number from the acknowledged sequence numbers.

19. The method of claim 17, wherein storing the sequence numbers includes storing a portion of the sequence numbers as negatively acknowledged sequence numbers based on transmissions associated with the portion of the sequence numbers being negatively acknowledged, and wherein the method further comprises providing, to the second parent IAB node, an indication of the negatively acknowledged sequence numbers.

20. The method of claim 17, wherein the sequence numbers are created and assigned by a BAP layer.

* * * * *